(12) United States Patent
Noh et al.

(10) Patent No.: US 12,487,506 B2
(45) Date of Patent: Dec. 2, 2025

(54) CAMERA DEVICE

(71) Applicant: LG INNOTEK CO., LTD., Seoul (KR)

(72) Inventors: Yun Ho Noh, Seoul (KR); Dong Hyun Kim, Seoul (KR); Hyun Soo Kim, Seoul (KR); Kap Jin Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 873 days.

(21) Appl. No.: 17/753,951

(22) PCT Filed: Sep. 15, 2020

(86) PCT No.: PCT/KR2020/012449
§ 371 (c)(1),
(2) Date: Mar. 18, 2022

(87) PCT Pub. No.: WO2021/054701
PCT Pub. Date: Mar. 25, 2021

(65) Prior Publication Data
US 2023/0350273 A1 Nov. 2, 2023

(30) Foreign Application Priority Data

Sep. 18, 2019 (KR) .................. 10-2019-0115045
Sep. 18, 2019 (KR) .................. 10-2019-0115046

(51) Int. Cl.
*H04N 23/54* (2023.01)
*G03B 17/12* (2021.01)
*H04N 23/53* (2023.01)

(52) U.S. Cl.
CPC ............ *G03B 17/12* (2013.01); *H04N 23/53* (2023.01); *H04N 23/54* (2023.01)

(58) Field of Classification Search
CPC .......... G03B 17/12; H04N 23/53; H04N 23/54
See application file for complete search history.

(56) References Cited

U.S. PATENT DOCUMENTS

| 10,241,240 B1 | 3/2019 | Choi |
| 2008/0267603 A1 | 10/2008 | Jung et al. |
| 2010/0247086 A1 | 9/2010 | Tallaron et al. |

(Continued)

FOREIGN PATENT DOCUMENTS

| KR | 10-2016-0081243 A | 7/2016 |
| KR | 10-2018-0088080 A | 8/2018 |

(Continued)

OTHER PUBLICATIONS

International Search Report dated Dec. 3, 2020 in International Application No. PCT/KR2020/012449.

(Continued)

*Primary Examiner* — Wen Huang
(74) *Attorney, Agent, or Firm* — Saliwanchik, Lloyd & Eisenschenk

(57) ABSTRACT

The present embodiment relates to a camera device comprising: a holder; a lens holder coupled to the holder; a variable lens unit arranged in the lens holder; and a holder terminal arranged on the holder, wherein the holder terminal is arranged on the upper surface of the holder and includes a first area electrically connected to the variable lens unit, and the variable lens unit does not overlap with the holder in the direction vertical to an optical axis.

17 Claims, 34 Drawing Sheets

(56) References Cited

U.S. PATENT DOCUMENTS

2017/0315274 A1 11/2017 Park et al.
2019/0129076 A1 5/2019 Choi

FOREIGN PATENT DOCUMENTS

| KR | 10-2018-0110796 A | 10/2018 |
| KR | 10-2019-0050272 A | 5/2019 |
| KR | 10-2019-0091719 A | 8/2019 |
| WO | 2017/188798 A1 | 11/2017 |

OTHER PUBLICATIONS

Office Action dated Jun. 11, 2023 in Chinese Application No. 202080072914.2.

FIG. 14
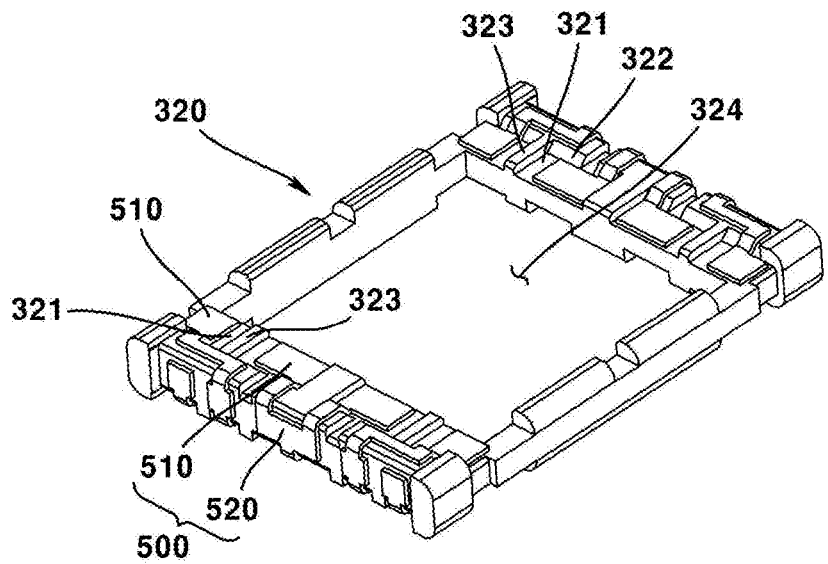
(a)
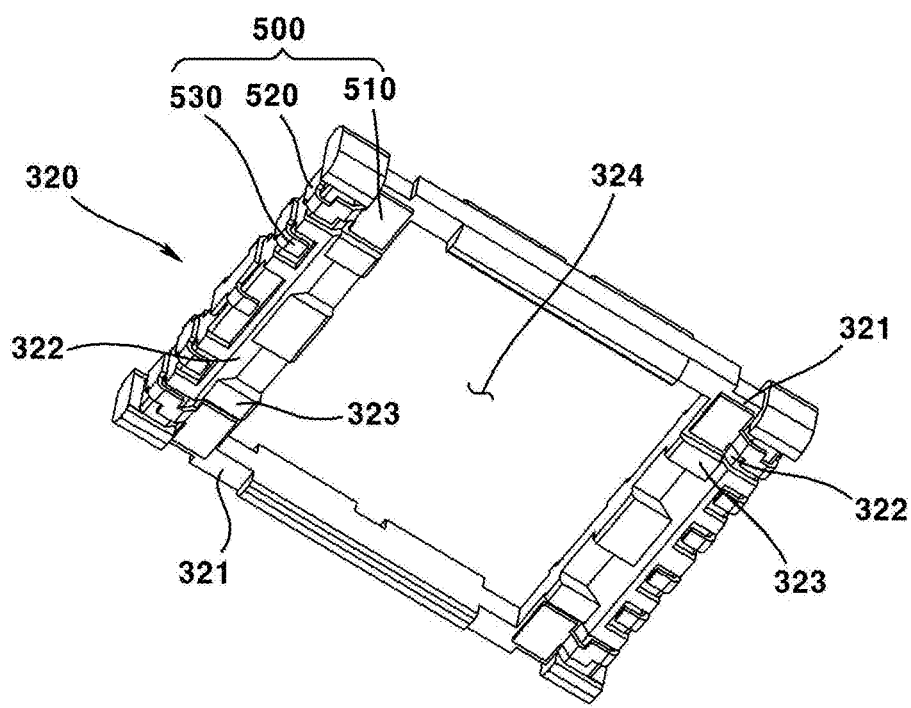
(b)

FIG. 34
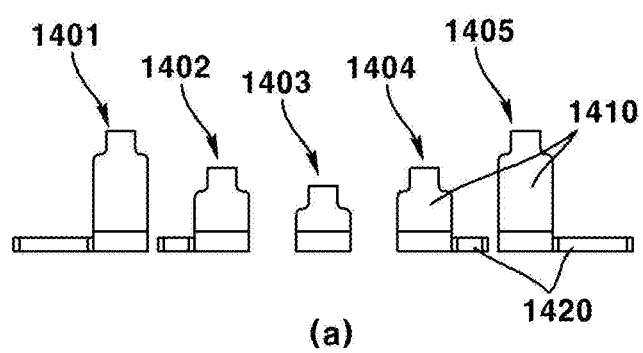
(a)
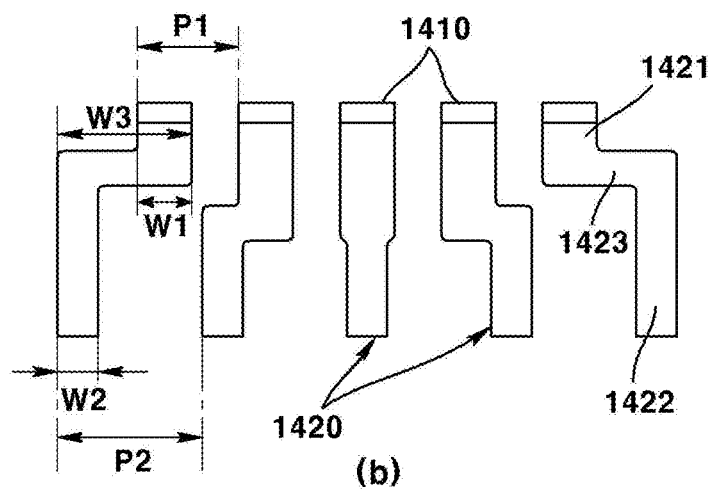 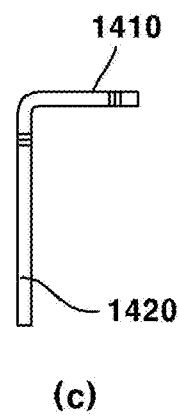
(b) (c)

FIG. 36
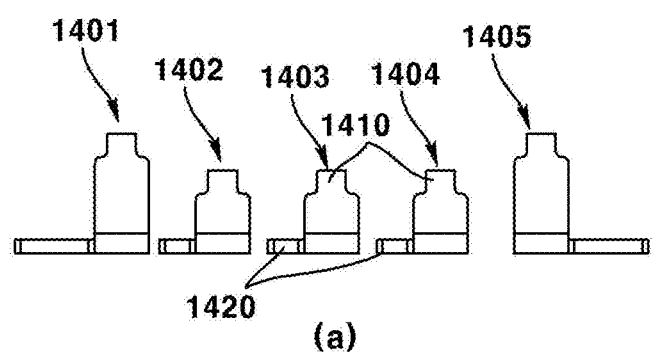
(a)
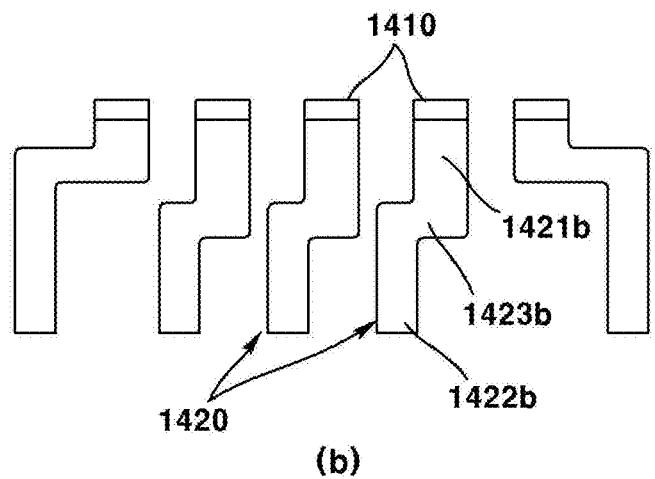
(b)
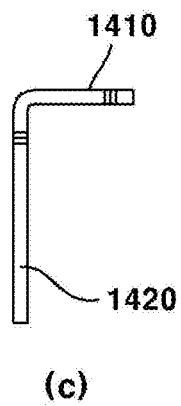
(c)

FIG. 37
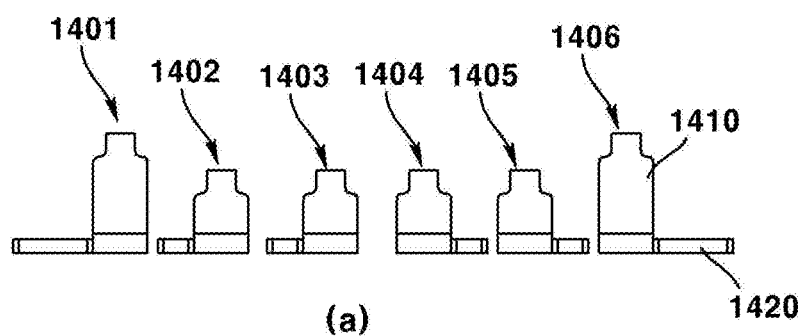
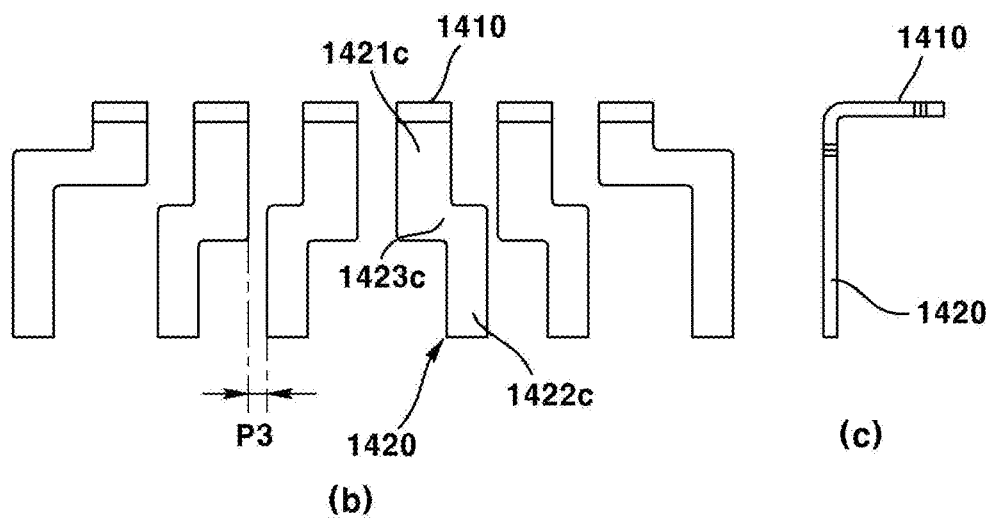
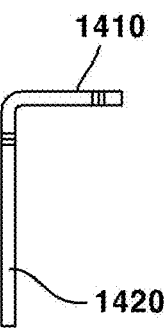

FIG. 38
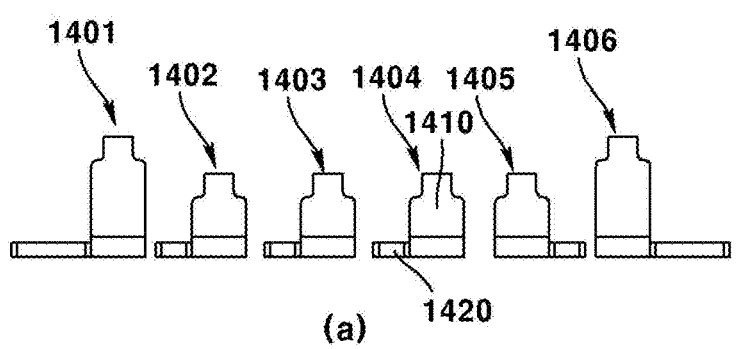
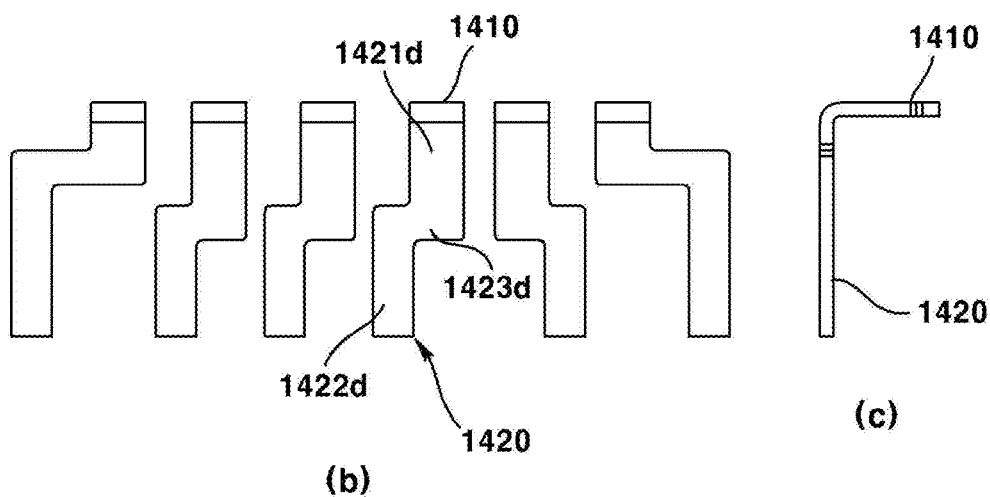
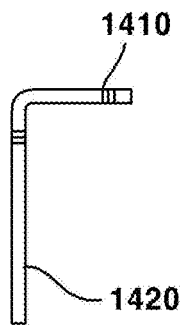

FIG. 39
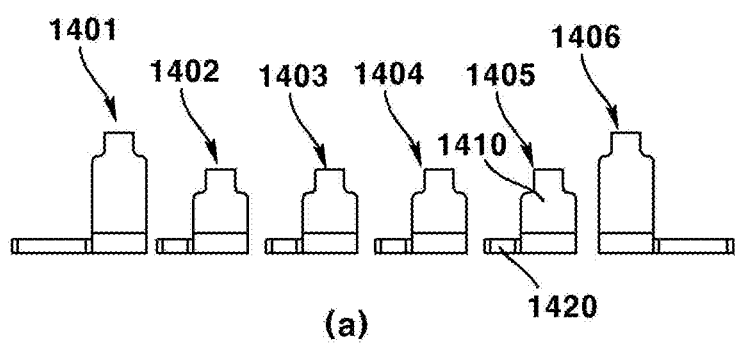
(a)
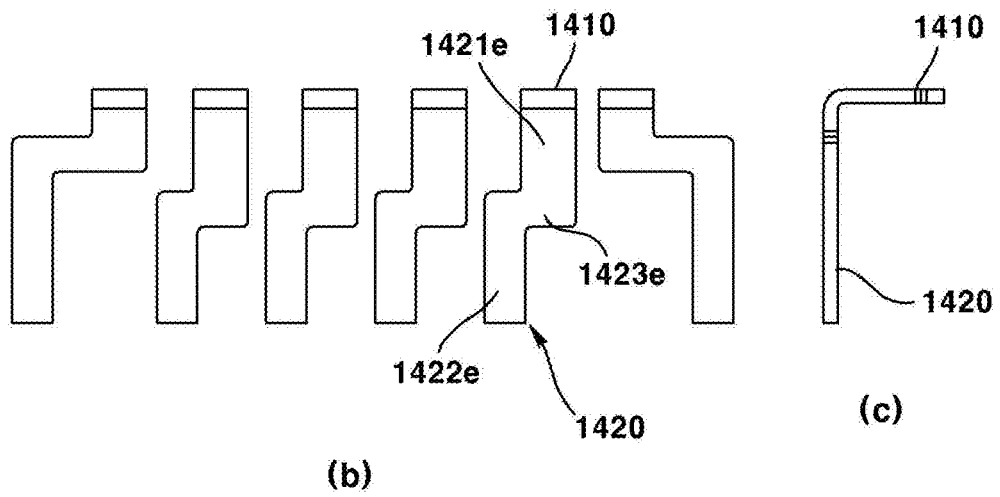
(b) (c)

CAMERA DEVICE

CROSS-REFERENCE TO RELATED APPLICATIONS

This application is the U.S. national stage application of International Patent Application No. PCT/KR2020/012449, filed Sep. 15, 2020, which claims the benefit under 35 U.S.C. § 119 of Korean Application Nos. 10-2019-0115045, filed Sep. 18, 2019; 10-2019-0115046, filed Sep. 18, 2019, the disclosures of each of which are incorporated herein by reference in their entirety.

TECHNICAL FIELD

The present embodiment relates to a camera device.

BACKGROUND ART

As the spread of various portable terminals is widely generalized and wireless Internet services are commercialized, the demands of consumers related to portable terminals are also diversifying, so that various types of additional devices are being installed in the portable terminals.

Among them, there is a camera module for photographing a subject as a photograph or a moving picture. Meanwhile, an autofocus function for automatically adjusting a focus according to a distance of a subject is applied to a recent camera module. In addition, a hand shake correction function that inhibits the image from being shaken due to hand shake of the photographer is applied.

In recent years, the shape of the lens is deformed according to the application of current, and development of a liquid lens that performs an autofocus function or an image stabilization function is being made. Accordingly, a conductive pattern structure for electrical conduction through a liquid lens in a camera device equipped with a liquid lens is required.

DETAILED DESCRIPTION OF THE INVENTION

Technical Subject

A first embodiment of the present invention is to provide a camera device comprising a conductive pattern structure for electrically connecting a liquid lens and a printed circuit board.

In particular, it is to provide a camera device having a high degree of freedom in designing a conductive pattern even when the number of electrodes of a liquid lens increases.

A second embodiment of the present invention is to provide a camera device having a minimized size in a direction perpendicular to an optical axis.

Technical Solution

A camera device according to a first embodiment of the present invention comprises: a holder; a lens holder being coupled to the holder; a variable lens unit being disposed in the lens holder; and a holder terminal being disposed on the holder, wherein the holder terminal is disposed on an upper surface of the holder and comprises a first region electrically connected to the variable lens unit, and wherein the variable lens unit may not be overlapped with the holder in a direction vertical to an optical axis.

The variable lens unit may comprise any one or more among a liquid lens, a polymer lens, a liquid crystal lens, a voice coil motor (VCM) actuator, a shape memory alloy (SMA) actuator, and a micro electro mechanical systems (MEMS) actuator.

the variable lens unit may comprise a liquid lens holder, a liquid lens being disposed in the liquid lens holder, a first connection terminal being disposed in the liquid lens holder, and a second connection terminal connecting a terminal of the liquid lens and the first connection terminal.

The first connection terminal may comprise a first region being disposed on an upper surface or a lower surface of the liquid lens holder and being connected to the second connection terminal, and a second region being extended from the first region of the first connection terminal and being disposed on a side surface of the liquid lens holder.

The first region of the holder terminal and the second region of the first connection terminal may be connected by a conductive member.

The first connection terminal and the second connection terminal are formed as separate members and may be connected by a conductive member.

The liquid lens holder comprises a groove being formed on at least one of an upper surface and a lower surface of the liquid lens holder, wherein a portion of the first region of the first connection terminal is being disposed on a bottom surface of the groove of the liquid lens holder, and wherein a conductive member may be disposed in the groove of the liquid lens holder to connect the first connection terminal and the second connection terminal.

The groove of the liquid lens holder is open inwardly to form a step having an inner wall, wherein the second connection terminal may be disposed inside the step of the liquid lens holder.

The holder terminal comprises a plurality of holder terminals, wherein the holder comprises a partition wall being protruded from an upper surface of the holder and being disposed between the plurality of holder terminals, and wherein an upper surface of the partition wall of the holder may be disposed at a position further lower than a lower end of the variable lens unit.

The camera device comprises: a printed circuit board; an image sensor being disposed on the printed circuit board; and a plurality of lenses coupled to the lens holder, wherein the holder is being disposed in the printed circuit board, and the variable lens unit may be disposed between the plurality of lenses.

The inner wall of the liquid lens holder may comprise an inclined surface.

The second connection terminal may be disposed in the groove of the liquid lens holder so as not to be more protruded than the liquid lens holder.

The first region of the holder terminal may be overlapped with the variable lens unit in the optical axis direction.

The variable lens unit may be more protruded than the lens holder in both sides, and at least a portion of the variable lens unit may be overlapped with the holder in a direction of the optical axis and be spaced apart from the holder to be disposed above the holder.

The camera device comprises a cover for covering the holder, the holder comprises a groove being recessedly formed in a side surface of the holder, the holder terminal comprises a second region being connected to the first region and being disposed on a bottom surface of the groove of the holder, and the second region of the holder terminal may be spaced apart from the cover in a direction perpendicular to the optical axis.

The camera device according to the second embodiment of the present invention comprises: a holder; a lens holder being coupled to the holder; a variable lens unit being disposed in the lens holder; a holder terminal being disposed in the holder; and a connection terminal being coupled to the variable lens unit, wherein the holder terminal comprises: a first portion being connected to the connection terminal through a conductive member; and a second portion being extended from the first portion and being disposed on a side surface of the holder, wherein the holder terminal comprises a plurality of holder terminals, and wherein the distance between the lower ends of the second portions of the plurality of holder terminals may be longer than the distance between the upper ends of the second portions of the plurality of holder terminals.

The second portion of the holder terminal may comprise: a first region being extended in a straight line from the first portion of the holder terminal; a second region being extended in a line and at least a portion not being overlapped with the first region in an optical axis direction; and a third region connecting the first region and the second region.

The second portion of the holder terminal may comprise: a first region being connected to the first portion of the holder terminal and having a first width; a second region at least a portion thereof is being disposed at a lower position than the first region and having a second width; and a third region being disposed between the first region and the second region and having a third width greater than the first width and the second width.

The second portion of the holder terminal may comprise: a first region being extended downward along the optical axis direction from the first portion of the holder terminal; a third region being extended in a different direction from the first region; and a second region being extended downward along the optical axis direction from the second region.

The second portion of the holder terminal may comprise: a third region being disposed long in the horizontal direction; and a first region connecting one end of the third region and the first portion of the holder terminal; and a second region being extended from the other end of the third region and forming a lower end of the second portion of the holder terminal.

The variable lens unit comprises a liquid lens, the liquid lens comprises four individual terminals and a common terminal, and the plurality of holder terminals may comprise five holder terminals being coupled to the four individual terminals and the common terminal of the liquid lens.

The side surface of the holder may comprise a plurality of side surfaces, wherein the second portion of the five holder terminals may be disposed on one side surface of the plurality of side surfaces of the holder.

The side surface of the holder comprises: a first side surface and a second side surface being disposed opposite to each other; and a third side surface and a fourth side surface connecting the first side surface and the second side surface and being disposed opposite to each other, wherein the second portion of the five holder terminals is being disposed on the first side surface of the holder, and wherein the holder terminal may not be disposed on the second to fourth side surfaces of the holder.

The variable lens unit may comprise a liquid lens and a liquid lens holder being coupled to the liquid lens, wherein the connection terminal may be coupled to the liquid lens holder.

The connection terminal may comprise a first terminal for electrically connecting first and second individual terminals being formed on an upper surface of the liquid lens to the holder terminal, respectively.

The connection terminal may comprise: a second terminal being connected to third and fourth individual terminals being formed on the upper surface of the liquid lens, respectively; a third terminal being coupled to the liquid lens holder and being electrically connected to the holder terminal; a fourth terminal connecting the second terminal and the third terminal and disposed below the liquid lens.

The connection terminal may comprise a fifth terminal being coupled to the liquid lens holder and being electrically connected to the holder terminal, and a sixth terminal connecting the common terminal and the fifth terminal being formed on a lower surface of the liquid lens.

The second portion of the holder terminal may comprise a curved portion.

The variable lens unit may comprise any one or more among a liquid lens, a polymer lens, a liquid crystal lens, a voice coil motor (VCM) actuator, a shape memory alloy (SMA) actuator, and a micro electro mechanical systems (MEMS) actuator.

The camera device comprises: a printed circuit board; an image sensor being disposed on the printed circuit board; and a lens being disposed within the lens holder, wherein the lower end of the second portion of the plurality of holder terminals may be electrically connected to the printed circuit board by solder.

The camera device according to the second embodiment of the present invention comprises: a holder; a lens holder being coupled to the holder; a variable lens unit being disposed on the lens holder; a holder terminal being disposed on the holder; and a connection terminal being coupled to the variable lens unit, wherein the holder terminal comprises: a first portion being connected to the connection terminal through a conductive member; a second portion being extended from the first portion and being disposed on a side surface of the holder, and wherein the second portion of the holder terminal may comprise: a first region being connected to the first portion of the holder terminal; at least a portion of the first region and a second region not being overlapped in an optical axis direction; and a third region connecting the first region and the second region.

Advantageous Effects

Through a first embodiment of the present invention, a stable electrical connection can be performed between a liquid lens and a printed circuit board.

Furthermore, even when the number of electrodes of a liquid lens increases, it is possible to provide a conductive pattern corresponding to the number of electrodes of the liquid lens.

Through a second embodiment of the present invention, the size of a camera device in a direction perpendicular to an optical axis can be minimized.

In addition, interference among a plurality of solders respectively connecting the holder terminals to a printed circuit board can be inhibited.

BRIEF DESCRIPTION OF DRAWINGS

FIG. 14 (a) is a perspective view illustrating a liquid lens holder and a first connection terminal of a camera device according to the first embodiment of the present invention, and FIG. 14 (b) is a bottom perspective view illustrating a liquid lens holder and a first connection terminal of a camera device according to a first embodiment of the present invention.

FIG. 34 (a) is a plan view illustrating a top view of a holder terminal according to a second embodiment of the present invention, (b) is a front view, and (c) is a side view.

FIG. 36 (a) is a plan view illustrating a top view of a holder terminal according to a second modified embodiment, (b) is a front view, and (c) is a side view.

FIG. 37 (a) is a plan view illustrating a top view of a holder terminal according to a third modified embodiment, (b) is a front view, and (c) is a side view.

FIG. 38 (a) is a plan view illustrating a top view of a holder terminal according to a fourth modified embodiment, (b) is a front view, and (c) is a side view.

FIG. 39 (a) is a plan view illustrating a top view of a holder terminal according to a fifth modified embodiment, (b) is a front view, and (c) is a side view.

BEST MODE

Figure 1:
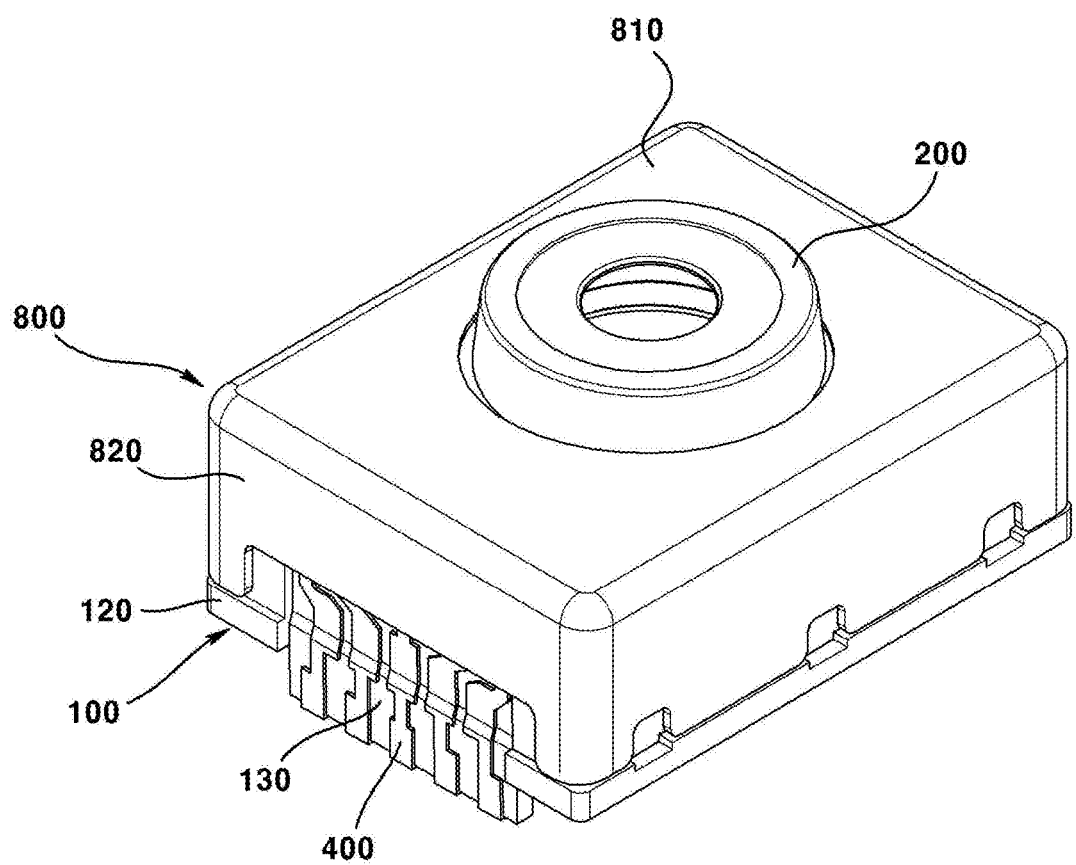
FIG. 1 is a perspective view of a partial configuration of a camera device according to a first embodiment of the present invention.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

Hereinafter, a configuration of an optical device according to a first embodiment of the present invention will be described.

The optical device may be any one among a hand phone, a mobile phone, a smart phone, a portable smart device, a digital camera, a laptop computer, a digital broadcasting terminal, a personal digital assistant (PDA), a portable multimedia player (PMP), and a navigation device. However, the type of the optical device is not limited thereto, and any device for photographing an image or a picture may be comprised in the optical device.

The optical device may comprise a main body. The main body may form an outer appearance of the optical device. The main body can accommodate the camera device. A display unit may be disposed on one surface of the main body. For example, the display unit and the camera device may be disposed on one surface of the main body, and the camera device may be additionally disposed on the other surface of the main body (a surface positioned opposite to one surface).

The optical device may comprise a display unit. The display unit can be disposed on one side of the main body. The display unit can output an image photographed by the camera device.

The optical device may comprise a camera device. The camera device can be disposed in the main body. At least a portion of the camera device can be accommodated inside the main body. A plurality of camera devices may be provided. The camera device may be disposed on one side of the main body and the other side of the main body, respectively. The camera device may photograph an image of a subject.

Hereinafter, a configuration of a camera device according to a first embodiment of the present invention will be described with reference to the drawings.

Figure 2:
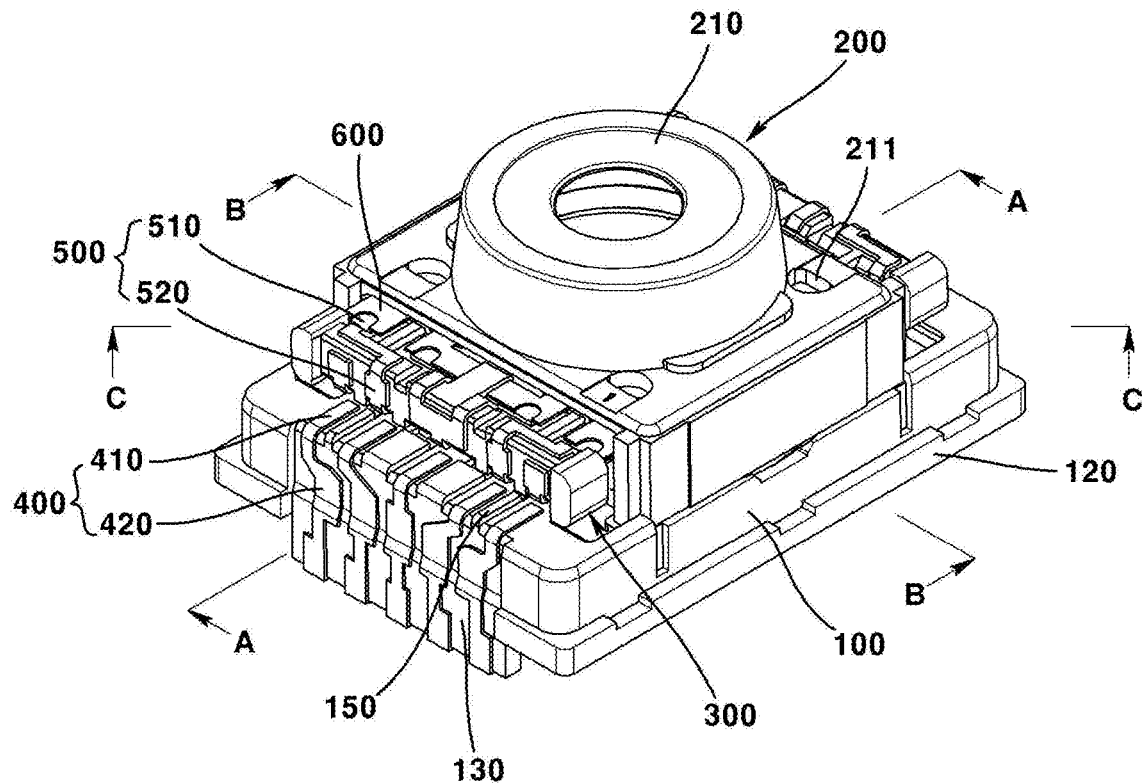
FIG. 2 is a perspective view of a state in which cover is omitted from a partial configuration of a camera device of FIG. 1.
Figure 3:
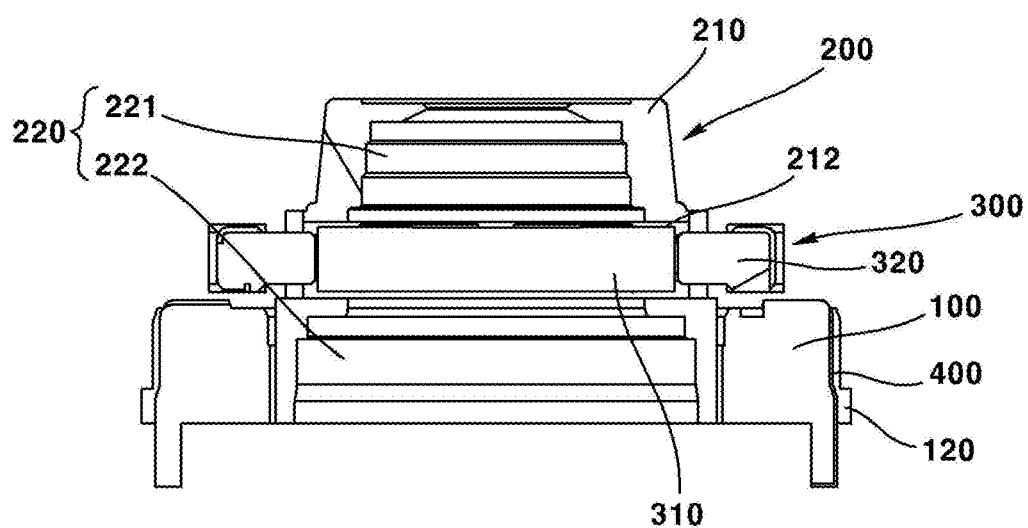
FIG. 3 is a cross-sectional view taken along line A-A of FIG. 2.
Figure 4:
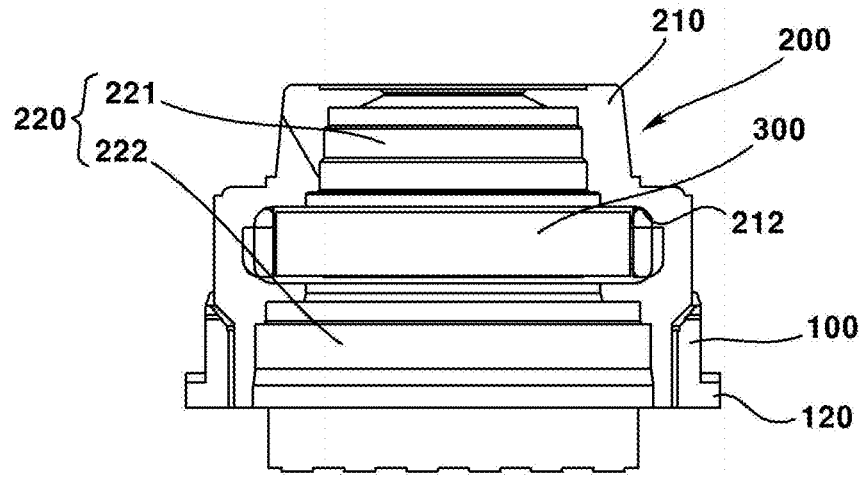
FIG. 4 is a cross-sectional view taken along line B-B of FIG. 2.
Figure 5:
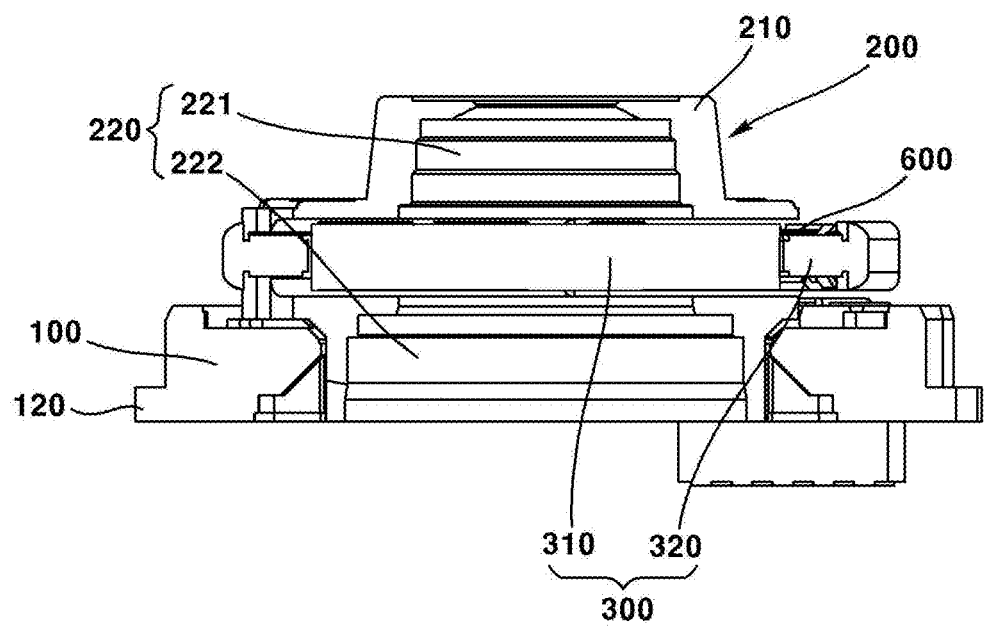
FIG. 5 is a cross-sectional view taken along line C-C of FIG. 2.
Figure 6:
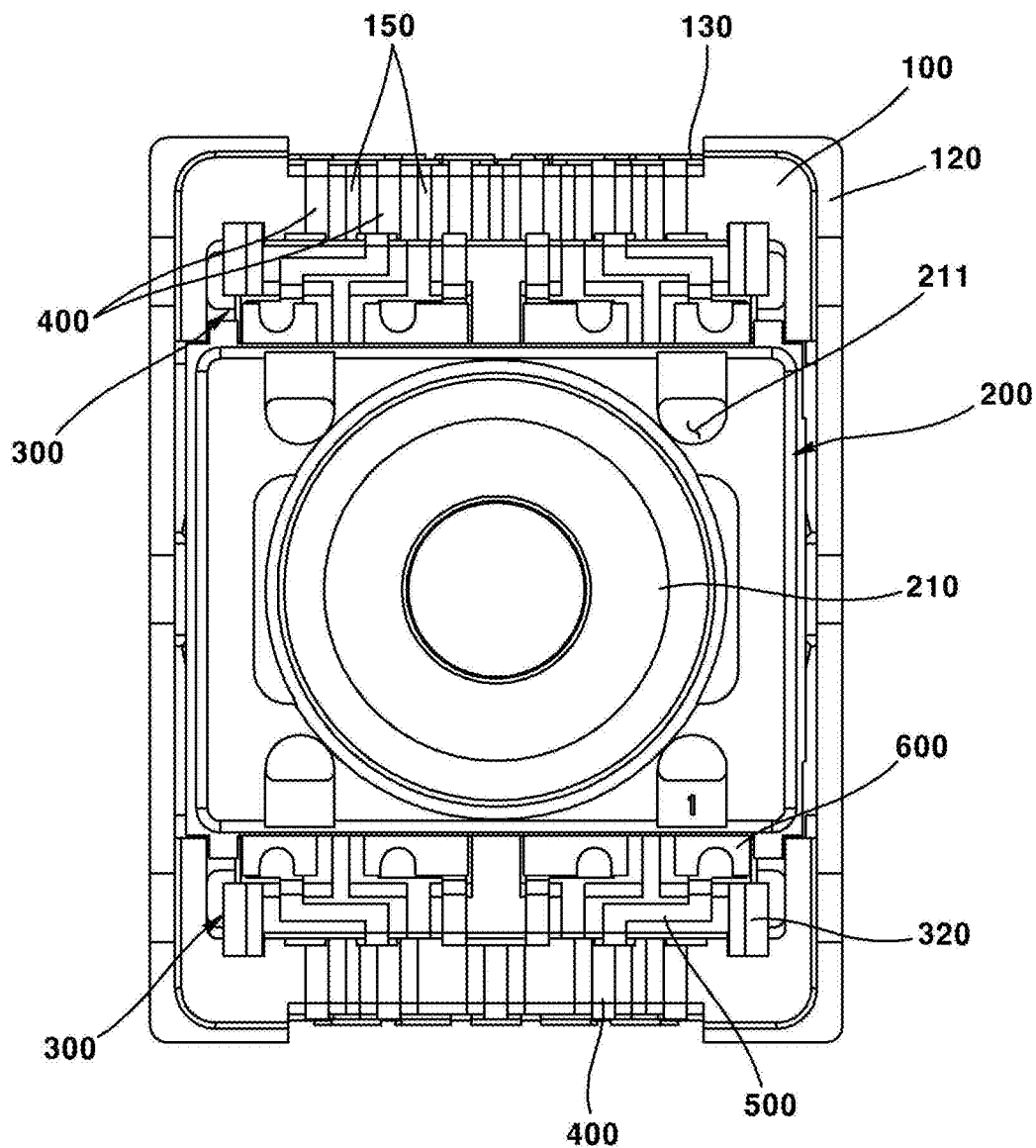
FIG. 6 is a plan view of a partial configuration of the camera device of FIG. 2 viewed from above.
Figure 7:
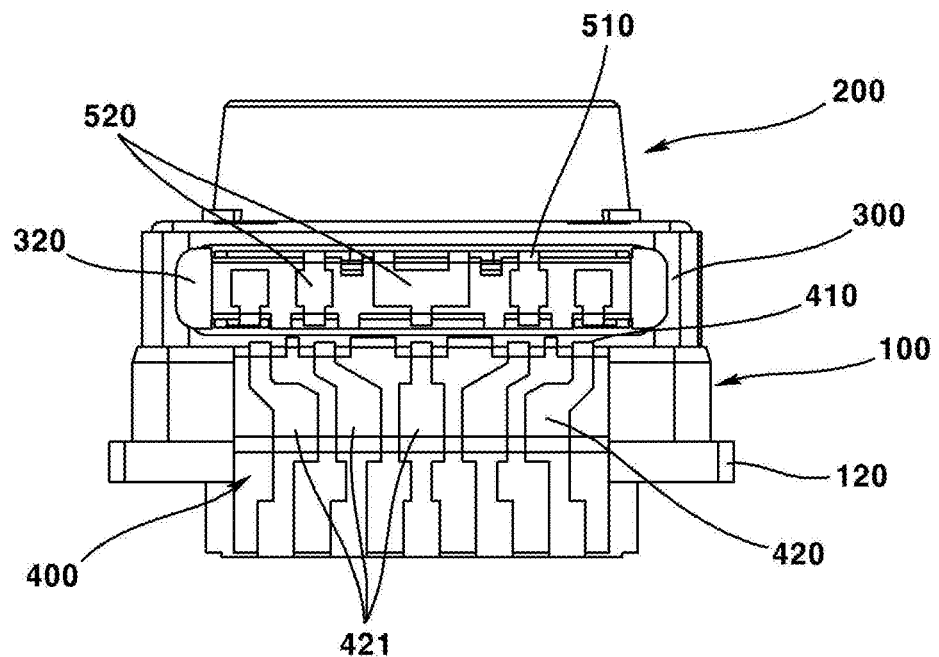
FIG. 7 is a side view of a partial configuration of the camera device of FIG. 2.
Figure 8:
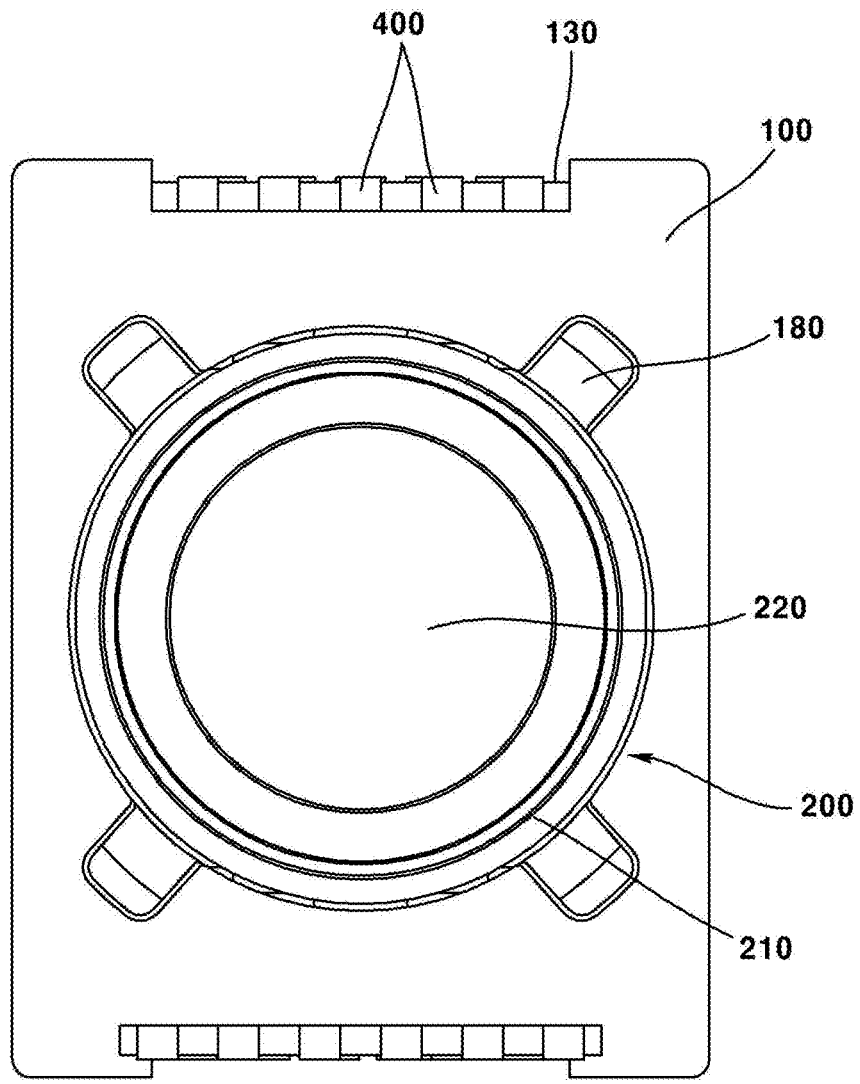
FIG. 8 is a bottom view of a partial configuration of the camera device of FIG. 2.
Figure 9:
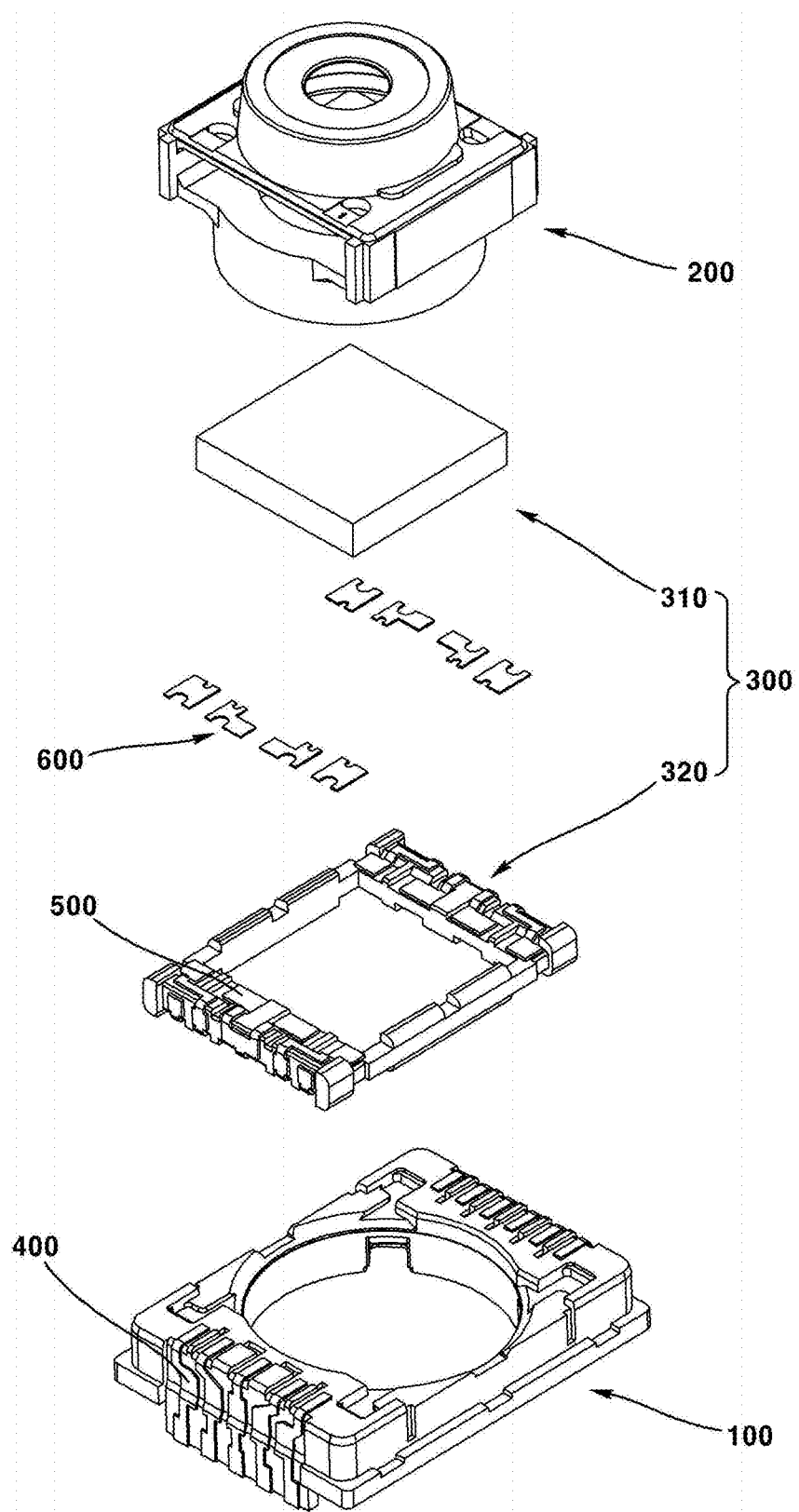
FIG. 9 is an exploded perspective view of a partial configuration of the camera device of FIG. 2.
Figure 10:
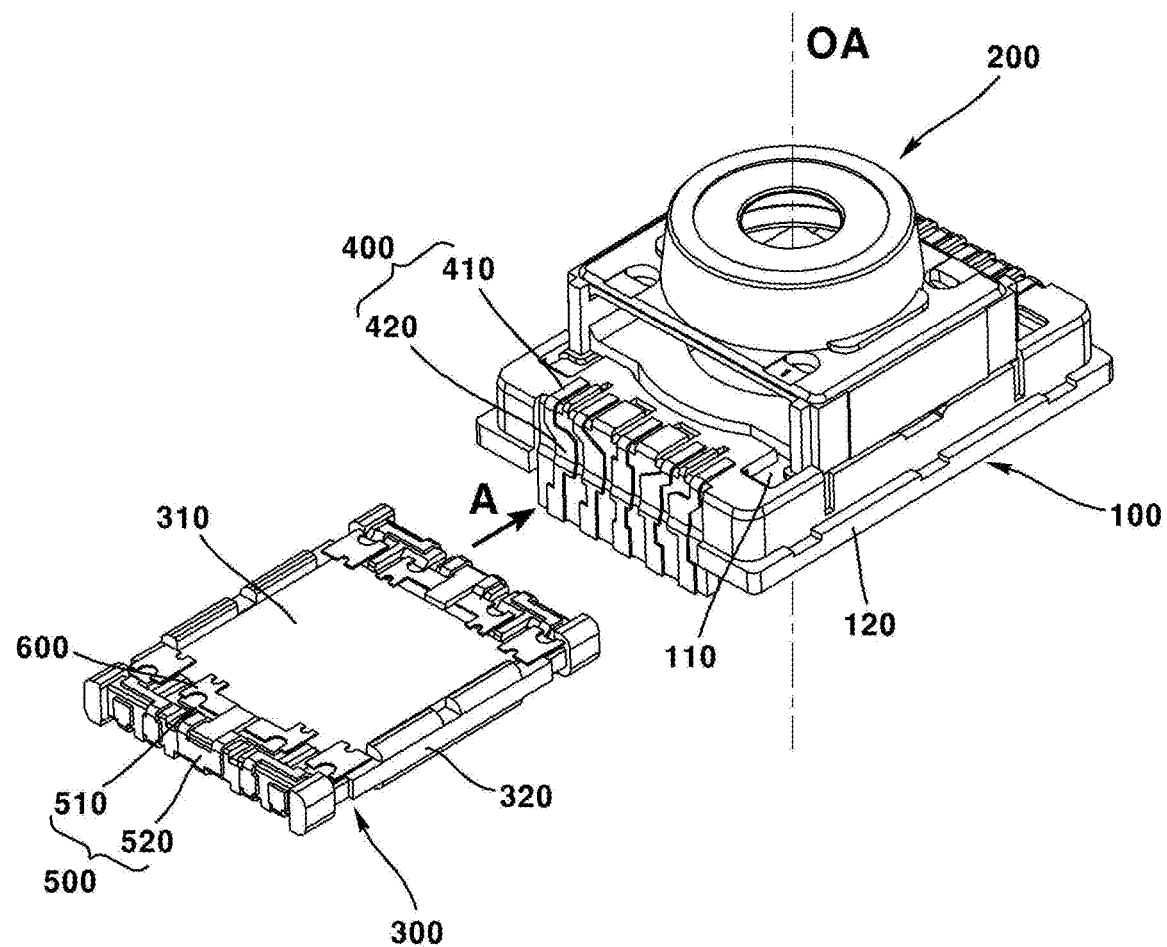
FIG. 10 is an exploded view in which a partial configuration of the camera device of FIG. 2 is partially disassembled.
Figure 11:
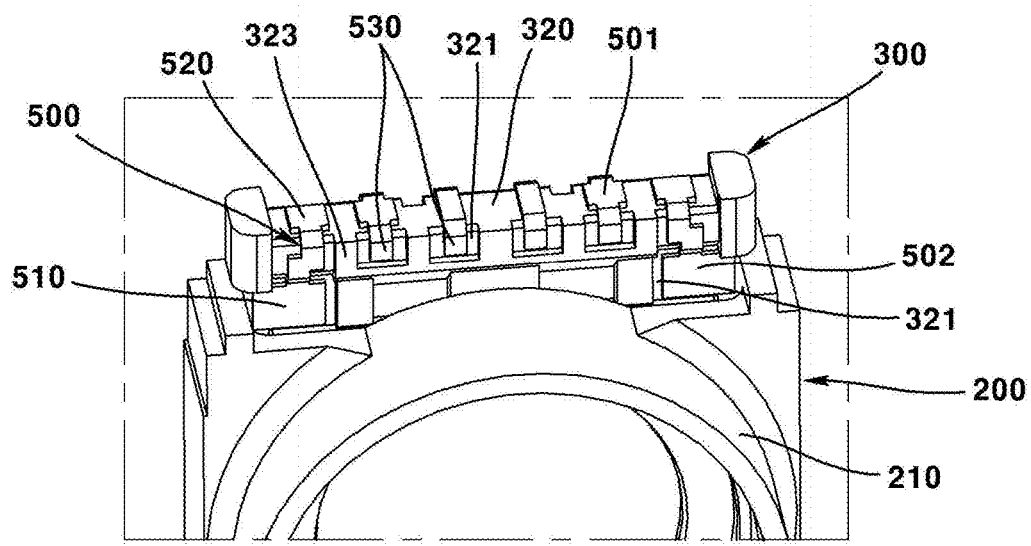
FIG. 11 is a bottom perspective view of a partial configuration of a camera device according to a first embodiment of the present invention.
Figure 12:
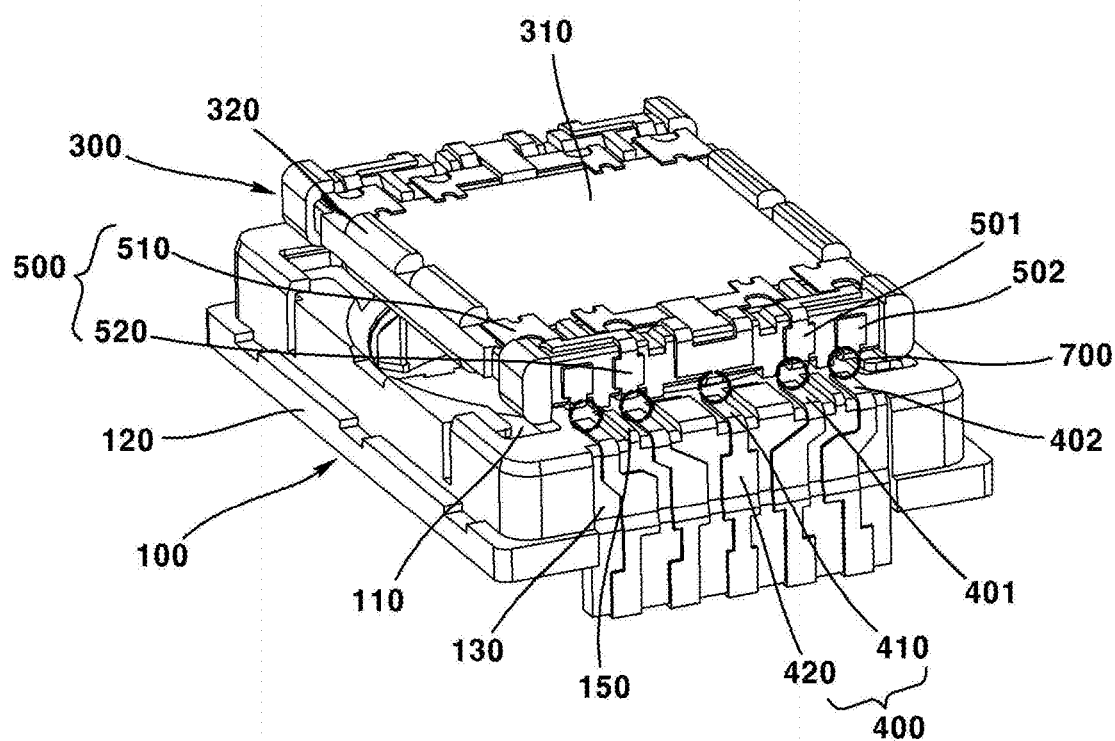
FIG. 12 is a perspective view of a partial configuration of a camera device according to a first embodiment of the present invention.
Figure 13:
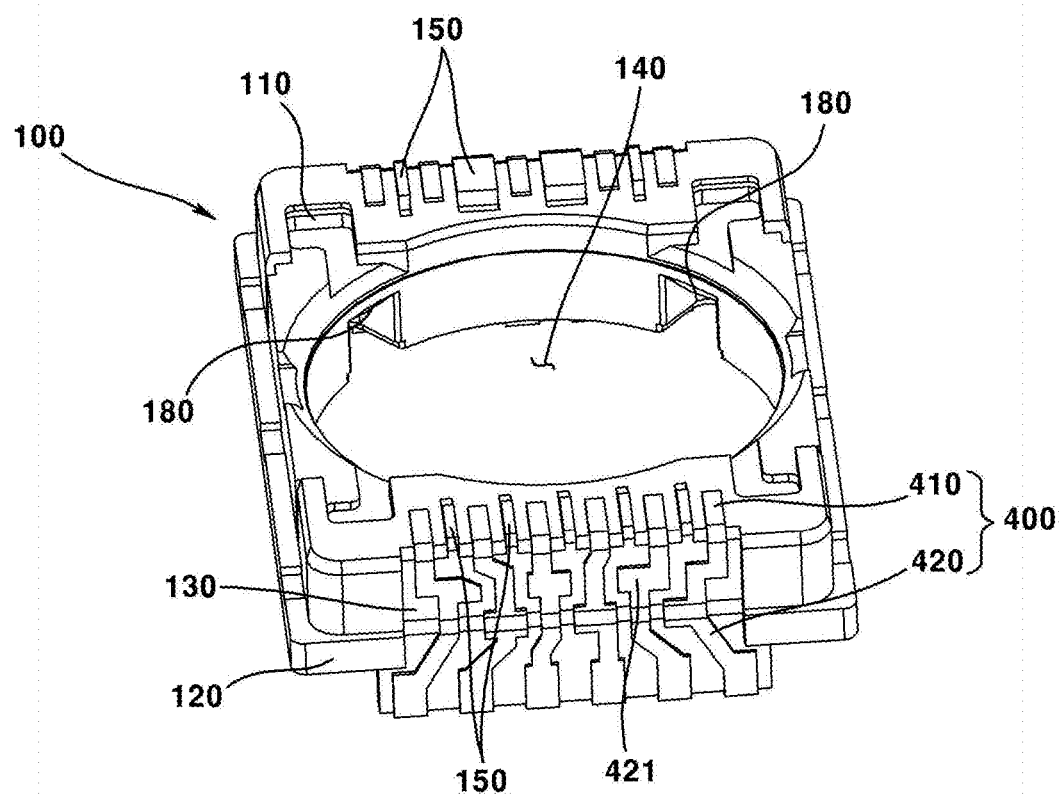
FIG. 13 is a perspective view of a state in which a variable lens unit is omitted from the partial configuration of the camera device of FIG. 12.
Figure 15:
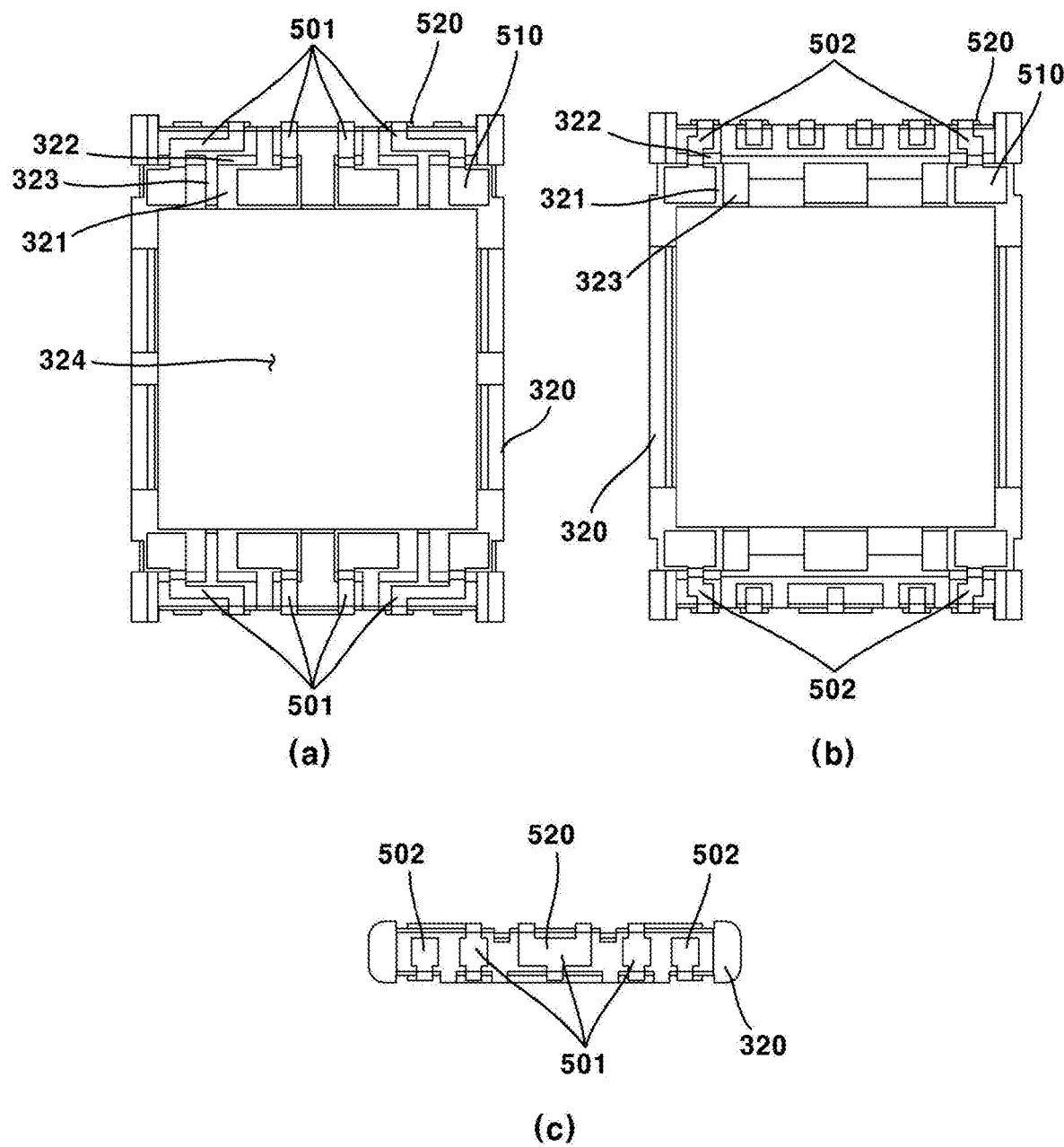
FIG. 15 (a) is a plan view illustrating a liquid lens holder and a first connection terminal of a camera device according to a first embodiment of the present invention, FIG. 15 (b) is a bottom view illustrating a liquid lens holder and a first connection terminal of a camera device according to a first embodiment of the present invention, and FIG. 15 (c) is a side view illustrating a liquid lens holder and a first connection terminal of a camera device according to a first embodiment of the present invention.
Figure 16:
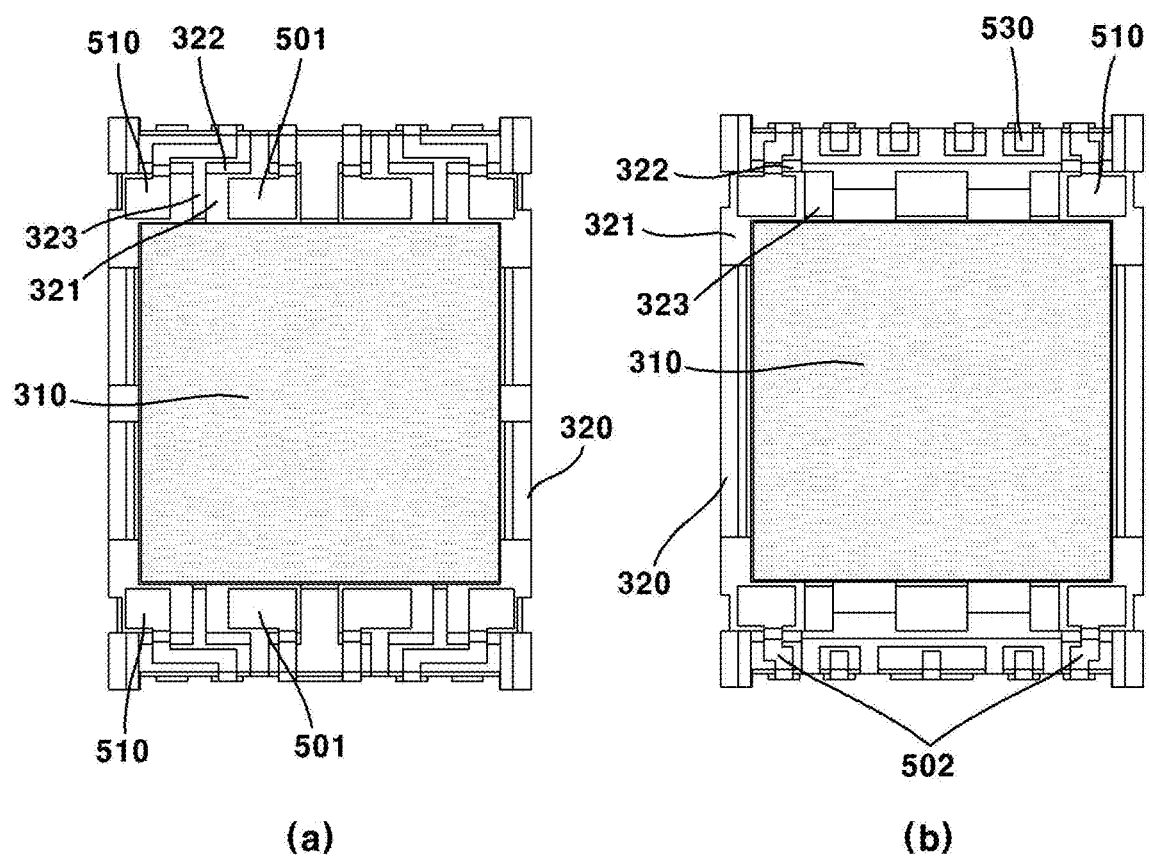
FIG. 16 (a) is a plan view of a state in which a liquid lens is disposed in the partial configuration of the camera device of FIG. 15, and FIG. 16 (b) is a bottom view of a state in which a liquid lens is disposed in the partial configuration of the camera device of FIG. 15.
Figure 17:
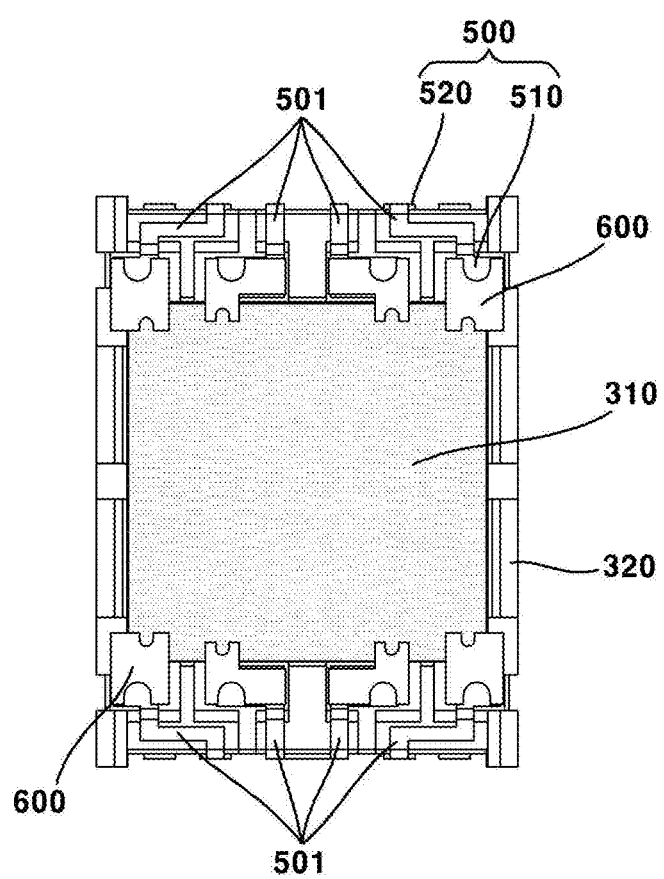
FIG. 17 is a plan view of a state in which a second connection terminal is disposed in the partial configuration of the camera device of FIG. 16.
Figure 18:
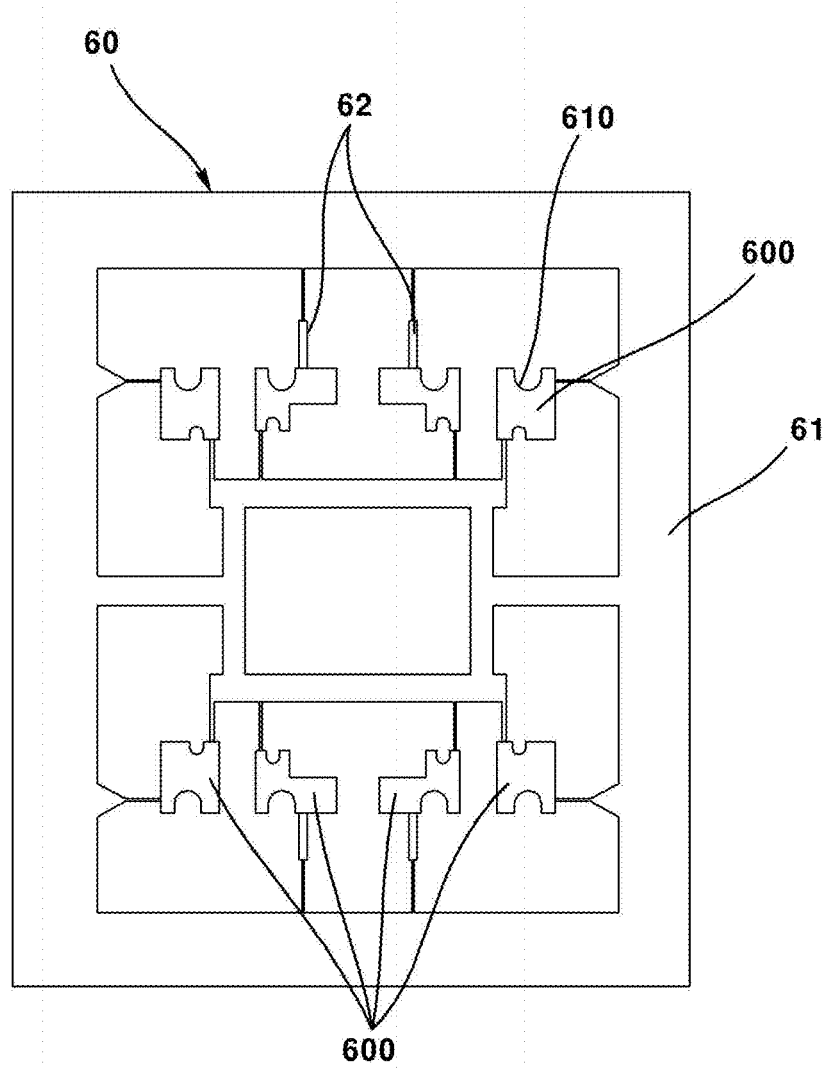
FIG. 18 is a plan view of a leaf spring used for manufacturing the camera device according to a first embodiment of the present invention.
Figure 19:
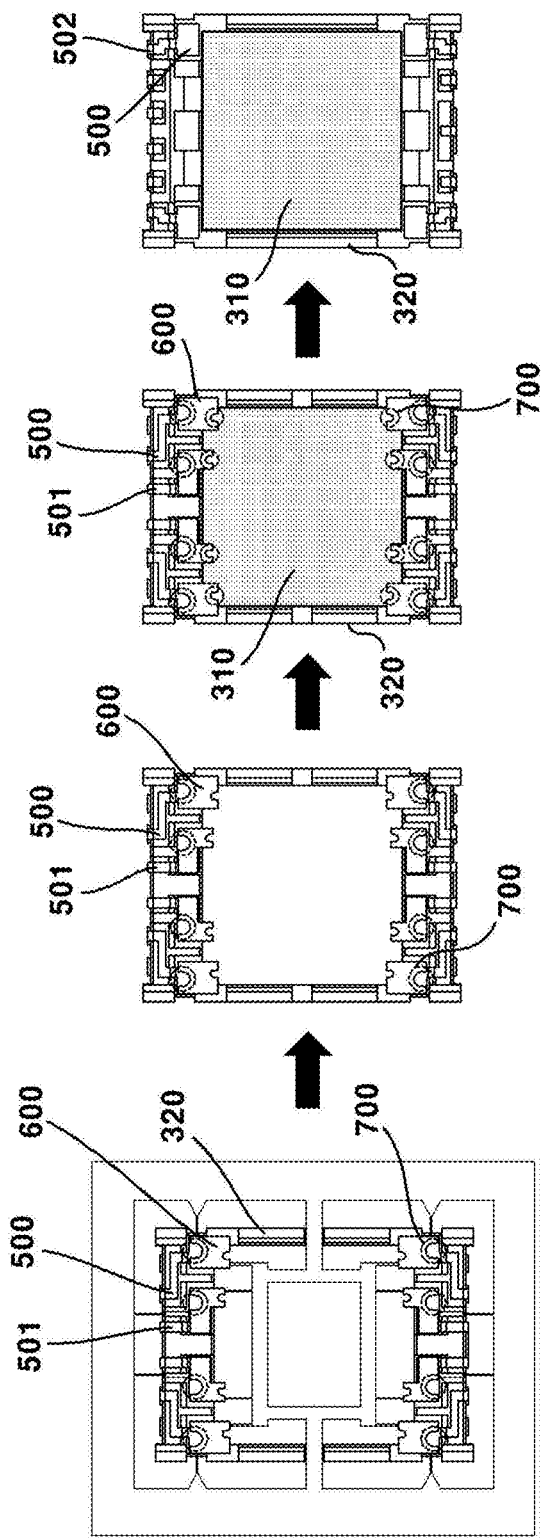
FIG. 19 is a view for explaining a process of manufacturing a variable lens unit of a camera device according to a first embodiment of the present invention.
Figure 20:
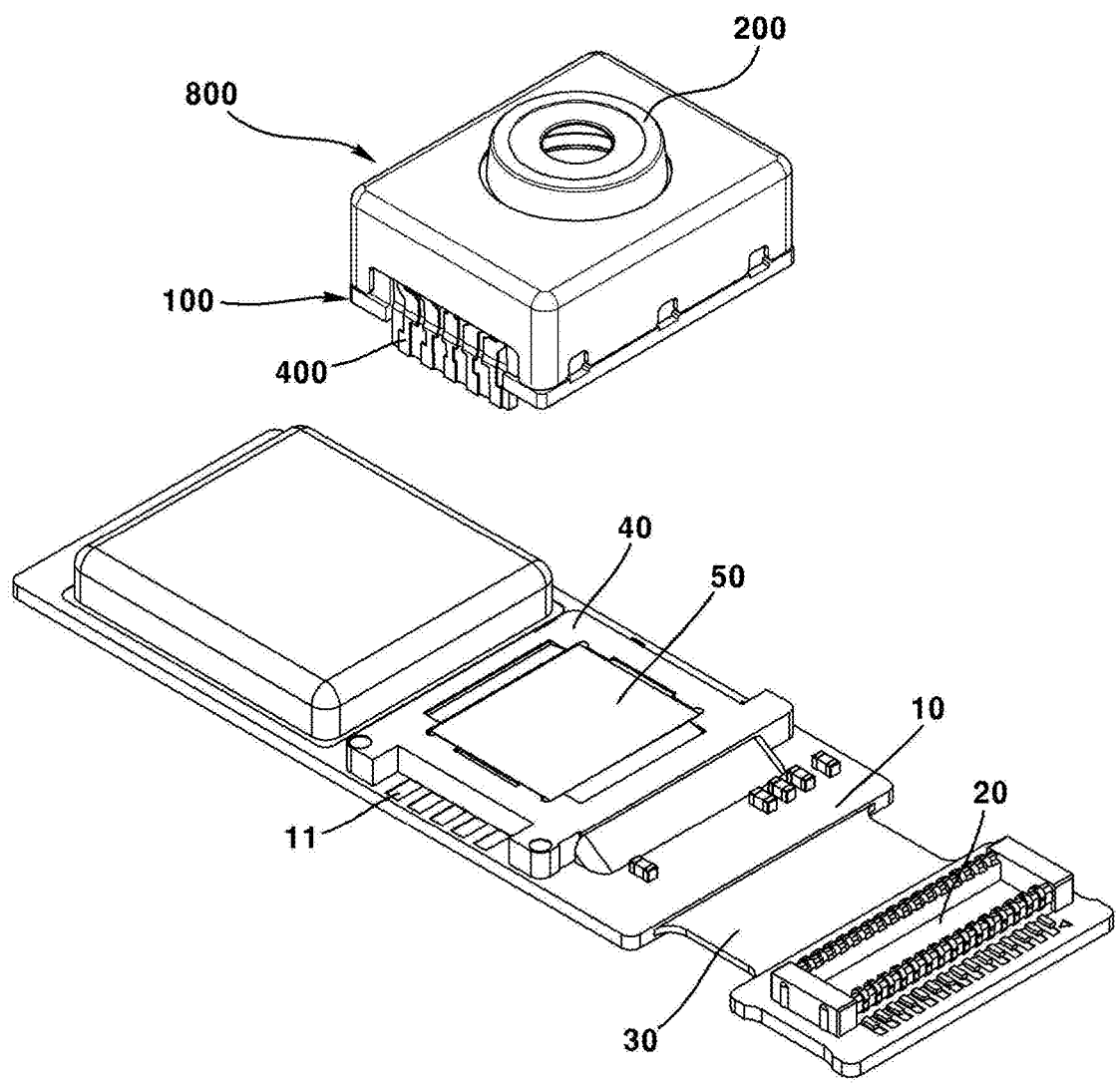
FIG. 20 is an exploded perspective view of the camera device according to a first embodiment of the present invention.

FIG. 1 is a perspective view of a partial configuration of a camera device according to a first embodiment of the present invention; FIG. 2 is a perspective view of a state in which cover is omitted from a partial configuration of a camera device of FIG. 1; FIG. 3 is a cross-sectional view taken along line A-A of FIG. 2; FIG. 4 is a cross-sectional view taken along line B-B of FIG. 2; FIG. 5 is a cross-sectional view taken along line C-C of FIG. 2; FIG. 6 is a plan view of a partial configuration of the camera device of FIG. 2 viewed from above; FIG. 7 is a side view of a partial configuration of the camera device of FIG. 2; FIG. 8 is a bottom view of a partial configuration of the camera device of FIG. 2; FIG. 9 is an exploded perspective view of a partial configuration of the camera device of FIG. 2; FIG. 10 is an exploded view in which a partial configuration of the camera device of FIG. 2 is partially disassembled; FIG. 11 is a bottom perspective view of a partial configuration of a camera device according to a first embodiment of the present invention; FIG. 12 is a perspective view of a partial configuration of a camera device according to a first embodiment of the present invention; FIG. 13 is a perspective view of a state in which a variable lens unit is omitted from the partial configuration of the camera device of FIG. 12; FIG. 14 (a) is a perspective view illustrating a liquid lens holder and a first connection terminal of a camera device according to the first embodiment of the present invention; FIG. 14 (b) is a bottom perspective view illustrating a liquid lens holder and a first connection terminal of a camera device according to a first embodiment of the present invention; FIG. 15 (a) is a plan view illustrating a liquid lens holder and a first connection terminal of a camera device according to a first embodiment of the present invention; FIG. 15 (b) is a bottom view illustrating a liquid lens holder and a first connection terminal of a camera device according to a first embodiment of the present invention; FIG. 15 (c) is a side view illustrating a liquid lens holder and a first connection terminal of a camera device according to a first embodiment of the present invention; FIG. 16 (a) is a plan view of a state in which a liquid lens is disposed in the partial configuration of the camera device of FIG. 15; FIG. 16 (b) is a bottom view of a state in which a liquid lens is disposed in the partial configuration of the camera device of FIG. 15; FIG. 17 is a plan view of a state in which a second connection terminal is disposed in the partial configuration of the camera device of FIG. 16; FIG. 18 is a plan view of a leaf spring used for manufacturing the camera device according to a first embodiment of the present invention; FIG. 19 is a view for explaining a process of manufacturing a variable lens unit of a camera device according to a first embodiment of the present invention; and FIG. 20 is an exploded perspective view of the camera device according to a first embodiment of the present invention.

The camera device may comprise a substrate 10. The substrate 10 may be a printed circuit board (PCB). The substrate 10 may comprise an upper surface. The image sensor and the sensor base 40 may be disposed on an upper surface of the substrate 10. The substrate 10 may comprise a terminal 11. The terminal 11 of the substrate 10 may be electrically connected to the holder terminal 400 through a conductive member.

The camera device may comprise an image sensor. The image sensor may be disposed in the substrate 10. The image sensor may be disposed in the substrate 10. The image sensor may be disposed on an upper surface of the substrate 10. The image sensor may be electrically connected to the substrate 10. For example, the image sensor may be coupled to the substrate 10 by a surface mounting technology (SMT).

As another example, the image sensor may be coupled to the substrate 10 by a flip chip technology. The image sensor may be disposed so that the lens 220 and the optical axis coincide. That is, an optical axis of the image sensor and an optical axis of the lens 220 may be aligned. The image sensor may convert light irradiated to an effective image region of the image sensor into an electrical signal. The image sensor may be any one among a charge coupled device (CCD), a metal oxide semi-conductor (MOS), a CPD, and a CID.

The camera device may comprise a connector 20. The connector 20 may be connected to the board 10 through the connection substrate 30. The connector 20 may comprise a port for electrically connecting to an external device.

The camera device may comprise a sensor base 40. The sensor base 40 may be disposed between the holder 100 and the substrate 10. The filter 50 may be disposed in the sensor base 40. An opening may be formed in a portion of the sensor base 40 in which the filter 50 is disposed so that light passing through the filter 50 may be incident on the image sensor.

The camera device may comprise a filter 50. The filter 50 may comprise an infrared filter. The infrared filter may block light of the infrared region from being incident on the image sensor. An infrared filter may reflect infrared radiation. Or, the infrared filter may absorb infrared radiation. The infrared filter may be disposed between the lens module 200 and the image sensor. The infrared filter may be disposed in the sensor base 40.

The camera device may comprise a holder 100. The holder 100 may be disposed to in the substrate 10. The holder 100 may be disposed in the sensor base 40. The holder 100 may be disposed on an upper surface of the sensor base 40. The holder 100 may be coupled to the sensor base 40. The holder 100 may be coupled to the lens module 200. The holder 100 may be disposed inside the cover 800. The holder 100 may be formed of an insulating material.

The holder 100 may comprise a groove 110. The groove 110 may be an epoxy tank in which the epoxy is accommodated. The groove 110 may be formed by being recessed in an upper surface of the holder 100. The groove 110 may be spaced apart from an inner surface of the holder 100. The groove 110 may be spaced apart from an outer surface of the holder 100. An adhesive may be disposed in the groove 110 of the holder 100. The adhesive disposed in the groove 110 of the holder 100 may attach the variable lens unit 300 to the holder 100.

The holder 100 may comprise a step portion 120. The step portion 120 may be protruded from a side surface of the holder 100. The step portion 120 may be formed on the outer circumference of the holder 100. A side plate 820 of the cover 800 may be disposed in the step portion 120. The step portion 120 may be overlapped with the side plate 820 of the cover 800 in a direction parallel to an optical axis (vertical direction).

The holder 100 may comprise a groove 130. The groove 130 of the holder 100 may be formed by being recessed in the side surface of the holder 100. The holder terminal 400 may be disposed on the bottom surface of the groove 130 of the holder 100. The groove 130 of the holder 100 may provide a space between the bottom surface of the groove 130 of the holder 100 and the side plate 820 of the cover 800. The groove 130 may be recessed from the side surface of the holder 100 to the side surface of the holder terminal 400. Through this, the groove 130 may expose at least a portion of the side surface of the holder terminal 400.

The holder 100 may comprise a hole 140. The hole 140 may be a hollow hole penetrating the holder 100 in an optical axis direction. The lens module 200 may be disposed in the hole 140.

The holder 100 may comprise a partition wall 150. The partition wall 150 may be protruded from an upper surface of the holder 100. The partition wall 150 may be disposed between the plurality of holder terminals 400. The partition wall 150 may be provided in plurality to form an epoxy tank in which Ag epoxy is accommodated. That is, an epoxy tank may be formed between the plurality of partition walls 150. In the present embodiment, the epoxy tank can be described as being formed as the partition wall 150 is being protruded from an upper surface of the holder 100. Or, the epoxy tank may be described to be formed by a groove into which a portion of an upper surface of the holder 100 is being recessed. In the present embodiment, an epoxy tank, which is a space in which the epoxy is accommodated, is formed between the plurality of partition walls 150, and this portion can be referred to as a groove. A conductive member may be disposed between the partition walls 150. Ag epoxy may be disposed between the partition walls 150.

In the present embodiment, the upper surface of the partition wall 150 of the holder 100 may be disposed at a lower position than the lower end of the variable lens unit 300. At this time, the upper surface of the partition wall 150 of the holder 100 may correspond to the uppermost end of the holder 100. Through this, all regions of the holder 100 can be disposed below the variable lens unit 300. That is, the holder 100 and the variable lens unit 300 may not be overlapped with each other in a direction perpendicular to the optical axis (horizontal direction).

The holder 100 may comprise a groove 180. The groove 180 may be formed on an inner circumferential surface of the holder 100. An adhesive for bonding the lens module 200 to the holder 100 may be disposed in the groove 180. The groove 180 may comprise a plurality of grooves. The groove 180 may comprise four grooves. In this case, the four grooves may be symmetrically disposed with respect to an optical axis.

The camera device may comprise a lens module 200. The lens module 200 may be coupled to the holder 100. At least a portion of the lens module 200 may be disposed inside the holder 100. The lens module 200 may be coupled to the holder 100.

The lens module 200 may comprise a lens holder 210. The lens holder 210 may be a lens barrel. The lens holder 210 may be coupled to the holder 100. The lens holder 210 may be disposed in the holder 100. The lens holder 210 may accommodate the lens therein. The inner circumferential surface of the lens holder 210 may be formed in a shape corresponding to the outer circumferential surface of the lens 220. The lens holder 210 may be formed of an insulating material.

The lens holder 210 may comprise a hole 211. The hole 211 may be formed in an upper surface of the lens holder 210. The hole 211 may be an adhesive injection hole for injecting an adhesive. An adhesive may be injected into the hole 211. An adhesive for bonding the variable lens unit 300 to the lens holder 210 may be disposed in the hole 211.

The lens holder 210 may comprise a hole 212. The hole 212 may be a variable lens accommodation hole in which the variable lens unit 300 is disposed. The variable lens unit 300 may be disposed in the hole 212. The hole 212 may be formed to have a height greater than the height of the variable lens unit 300 by a predetermined size. The hole 212 may penetrate through the lens module 200 in a direction perpendicular to the optical axis. The liquid lens 310 may be horizontally inserted into the hole 212 of the lens module 200 and coupled thereto. The hole 211 and the hole 212 of the lens holder 210 may be referred to as 'a first hole' and a 'second hole' to distinguish them from each other.

The lens module 200 may comprise a lens 220. The lens 220 may be disposed in the lens holder 210. The lens 220 may be a solid lens 220. The lens 220 may be a plastic lens. The lens 220 may comprise a plurality of lenses. The lens 220 may comprise an upper lens 221 and a lower lens 222. The upper lens 221 may be dispose on an upper side of the liquid lens 310. The lower lens 222 may be dispose on a lower side of the liquid lens 310. Each of the upper lens 221 and the lower lens 222 may comprise a plurality of lenses. The upper lens 221 may comprise three or two lenses, and the lower lens 222 may comprise two or three lenses. Or, at least one of the upper lens 221 and the lower lens 222 may comprise four or more lenses. However, the number of lenses of the upper lens 221 and the number of lenses of the lower lens 222 are not limited thereto. Although a lens 220, an upper lens 221, and a lower lens 222 are illustrated in the drawing, what the corresponding reference numbers refer to in the drawings may correspond to a space, not a lens, in which a lens is accommodated.

The camera device may comprise a variable lens unit 300. The variable lens unit 300 may be disposed in the lens holder 210. The variable lens unit 300 may be coupled to the lens module 200. The variable lens unit 300 may be coupled to the lens holder 210. The variable lens unit 300 may be disposed in the lens holder 210. The variable lens unit 300 may be spaced apart from the holder 100. The variable lens unit 300 may be aligned with the lens 220 and the image sensor. The variable lens unit 300 may be fixedly inserted into the lens module 200 in a horizontal direction. The variable lens unit 300 may be disposed between the plurality of lenses 220.

In the present embodiment, the variable lens unit 300 may not be overlapped with the holder 100 in a direction perpendicular to the optical axis (horizontal direction). In the present embodiment, through this feature, even in a state in which the lens holder 210 is coupled to the holder 100, the variable lens unit 300 is inserted into the hole 212 of the lens holder 210 in a direction perpendicular to the optical axis (refer to OA in FIG. 10) so as to be assembled (refer to A of FIG. 10). That is, in the present embodiment, the lens holder 210 is coupled to the lens holder 210 first, and the variable lens unit 300 may be coupled later. The variable lens unit 300 may be more protruded than the lens holder 210 in both side directions. At least a portion of the variable lens unit 300 may be overlapped with the holder 100 in the optical axis direction. At this time, at least a portion of the variable lens unit 300 may be spaced apart from the holder 100 and disposed above the holder 100.

The variable lens unit 300 may comprise a variable lens. The variable lens may be a variable focus lens. The variable lens may be a lens whose focus can be adjusted. The focus may be adjusted by moving the lens and/or changing the shape of the lens. The variable lens unit liquid lens 310, may comprise any one or more among polymer lenses, liquid crystal lenses, VCM (voice coil motor) actuators, SMA (shape memory alloy) actuators, and MEMS (micro electro mechanical systems) actuators.

The liquid lens 310 may comprise at least one of a liquid lens 310 comprising one type of liquid and a liquid lens 310 comprising two types of liquids. The liquid lens 310 comprising one type of liquid may change the focus by adjusting a membrane being disposed at a position corresponding to the liquid. For example, the focus can be changed by pressing the membrane by the electromagnetic force of the magnet and coil. The liquid lens 310 comprising two types of liquids may comprise a conductive liquid and a non-conductive liquid. In this case, the focus may be changed by adjusting the interface formed between the conductive liquid and the non-conductive liquid by using the voltage applied to the liquid lens 310.

The polymer lens can change the focus by adjusting a polymer material through a driving unit such as a piezo. The liquid crystal lens can change the focus by controlling the liquid crystal by electromagnetic force. The VCM actuator can change focus by moving a solid lens or a lens assembly comprising a solid lens through electromagnetic force between a magnet and a coil. The SMA actuator may change the focus by moving a solid lens or a lens assembly comprising the solid lens using a shape memory alloy. The MEMS actuator may change a focus by moving a solid lens or a lens assembly comprising the solid lens through electrostatic force generated when voltage is applied.

The variable lens unit 300 may comprise a liquid lens 310. The liquid lens 310 may be disposed in the lens module 200. The liquid lens 310 may be disposed in the liquid lens holder 320. The liquid lens 310 may be disposed between the plurality of lenses 220. The liquid lens 310 may be disposed between the upper lens 221 and the lower lens 222. The liquid lens 310 may be disposed in the hole 212 of the lens module 200.

The liquid lens 310 may comprise a terminal. The liquid lens 310 whose focal length is adjusted in response to a driving voltage may receive an operating voltage through a terminal. The terminal of the liquid lens 310 may comprise an individual terminal and a common terminal. The individual terminal may comprise four individual terminals disposed at the four corners of the liquid lens 310. The individual terminals may be disposed on an upper surface of the liquid lens 310. At this time, individual terminals can be called upper terminals. The common terminal may comprise four common terminals disposed at the four corners of the liquid lens 310. The common terminal may be disposed on a lower surface of the liquid lens 310. At this time, the common terminal may be called a lower terminal. When an operating voltage is applied through the individual terminals and the common terminal, the interface between the conductive liquid and the non-conductive liquid disposed in the lens region may be deformed.

One side of the liquid lens 310 may receive a voltage from an individual terminal. The other side of the liquid lens 310 may receive a voltage from a common terminal. In the present embodiment, the individual terminals of the liquid lens 310 may be individual electrodes and the common terminal may be common electrodes. Or, the individual terminals of the liquid lens 310 may be common electrodes and the common terminals may be individual electrodes. In the liquid lens 310, the interface formed between the conductive liquid and the non-conductive liquid may be deformed by current and/or voltage applied to the individual terminals and the common terminals. Through this, any one or more of the AF function and the OIS function may be performed.

The liquid lens 310 may not be seen by being masked by the lens holder 210 when viewed from above as illustrated in FIG. 6. That is, the liquid lens 310 may not have a portion exposed toward the outer side of the lens holder 210. The liquid lens holder 320 may be protruded to the outer side of the lens holder 210. However, in a modified embodiment, the liquid lens 310 may be protruded more outward than the lens holder 210. That is, a portion of the liquid lens 310 may be exposed and can be seen when viewed from above.

The liquid lens 310 may be spaced apart from the solid lens 220. In the present embodiment, an epoxy may be applied to the space between the liquid lens 310 and the solid lens 220 and/or between the liquid lens holder 320 and the lens holder 210. At this time, active alignment between the liquid lens 310 and the solid lens 220 may be performed.

Active alignment between the liquid lens 310 and the solid lens 220 may be performed through the following steps. First, the liquid lens 310 may be disposed on the solid lens 220 and the assembly of the liquid lens 310 and the solid lens 220 may be disposed above the master sensor. Thereafter, while moving the liquid lens 310 above a virtual grid pattern and applying voltages assigned to a plurality of codes to the liquid lens 310, a point with the greatest amount of light detected by the master sensor may be determined. When the point with the greatest amount of light is determined, the liquid lens 310 is positioned at the corresponding point, and the epoxy for attaching the liquid lens 310 to the solid lens 220 can be pre-cured through ultraviolet rays. Thereafter, the liquid lens 310 may be fixed to the solid lens 220 by main curing the epoxy through heat.

Meanwhile, the lens unit formed by fixing the liquid lens 310 to the solid lens 220 may be actively aligned with the image sensor. While the lens unit is moved above the virtual grid and voltages assigned to a plurality of codes are applied to the liquid lens 310, the point where the amount of light detected by the image sensor is greatest can be determined, and the lens unit can be fixed at the corresponding point. At this time, like the coupling of the liquid lens 310 and the solid lens 220 above, the lens unit can be fixed in place through pre-curing and main curing using epoxy.

Furthermore, although it has been described above that the liquid lens 310 is first actively aligned with the solid lens 220 and the assembly of the liquid lens 310 and the solid lens 220 is actively aligned with the image sensor, the solid lens 220 and the image sensor may be first actively aligned and then the liquid lens 310 may be actively aligned, or the liquid lens 310 and the image sensor may be first actively aligned and then the solid lens 220 may be actively aligned. In particular, in the present embodiment, as described above, since it is possible to couple the lens module 200 to the holder 100 first and then assemble the variable lens unit 300, the liquid lens 310 may be aligned after aligning the solid lens 220 and the image sensor first.

The variable lens unit 300 may comprise a liquid lens holder 320. The liquid lens holder 320 may be a variable lens holder. The liquid lens holder 320 may be coupled to the liquid lens 310. The lower surface of the liquid lens holder 320 may be disposed higher than the upper surface of the holder 100. The liquid lens 310 may be disposed inside the liquid lens holder 320. In the liquid lens holder 320, the first connection terminal 500 may be integrally formed by a molded interconnection device (MID) method or insert injection. Or, the first connection terminal 500 formed as a separate terminal in the liquid lens holder 320 may be disposed.

The liquid lens holder 320 may comprise a groove 321. The groove 321 of the liquid lens holder 320 may be formed in at least one of an upper surface and a lower surface of the liquid lens holder 320. At this time, a portion of the first region 410 of the first connection terminal 500 may be disposed on a bottom surface of the groove 321 of the liquid lens holder 320. In addition, a conductive member is disposed in the groove 321 of the liquid lens holder 320 to connect the first connection terminal 500 and the second connection terminal 600. The groove 321 may be open inwardly. The groove 321 may be open toward the outer side. The groove 321 may be extended beyond the disposed portion of the first connection terminal 500 from the lower surface of the liquid lens holder 320 as illustrated in FIG. 14 (b). The groove 321 may comprise a plurality of grooves. The groove 321 may be formed for each portion where the first connection terminal 500 is being disposed. The groove 321 may be formed even in a portion where the first connection terminal 500 is not disposed. The groove 321 may be formed to be larger than the size of the first connection terminal 500.

The groove 321 of the liquid lens holder 320 may be open inwardly to form a step having an inner wall 322. The liquid lens holder 320 may comprise an inner wall 322. At this time, the second connection terminal 600 may be disposed inside the inner wall 322 of the liquid lens holder 320. The inner wall 322 of the liquid lens holder 320 may comprise an inclined surface.

The liquid lens holder 320 may comprise a partition wall 323. The partition wall 323 may be formed between a plurality of first connection terminals. The partition wall 323 may form an independent space at a location where each of the plurality of first connection terminals is disposed. Through this, it is possible to inhibit the flow of the conductive member in contact with the first connection terminal to connect a plurality of different first connection terminals.

The liquid lens holder 320 may comprise a hole 324. The hole 324 may be a hollow hole formed in the central portion of the liquid lens holder 320. The hole 324 may penetrate through the liquid lens holder 320 in an optical axis direction.

The camera device may comprise a holder terminal 400. The holder terminal 400 may be disposed in the holder 100. The holder terminal 400 may be integrally formed in the holder 100 through insert injection. The holder terminal 400 may be integrally formed with the holder 100 through a molded interconnection device (MID) method. The holder terminal 400 may be exposed on a portion of the bottom surface of the groove 110 of the holder 100. The holder terminal 400 may electrically connect the first and second connection terminals 500 and 600 and the substrate 10.

The holder terminal 400 may comprise a plurality of holder terminals. The holder terminal 400 may comprise ten terminals. The number of holder terminals 400 may correspond to the number of terminals of the liquid lens 310. Or, the number of the holder terminals 400 may be one more than the number of individual terminals of the liquid lens 310. In the present embodiment, the number and pattern shape of the holder terminals 400 may be designed in various ways in consideration of the number of terminals of the liquid lens 310.

The holder terminal 400 may comprise a first terminal 401. The first terminal 401 may be electrically connected to an individual terminal of the liquid lens 310. The first terminal 401 may be electrically connected to an individual terminal of the liquid lens 310, the first terminal 501 of the first connection terminal 500, the second connection terminal 600, and the substrate 10. The holder terminal 400 may comprise a second terminal 402. The second terminal 402 may be electrically connected to a common terminal of the liquid lens 310. The second terminal 402 may be electrically connected to the common terminal of the liquid lens 310, the second terminal 502 of the first connection terminal 500, the second connection terminal 600, and the substrate 10.

The holder terminal 400 may comprise a first region 410. The first region 410 of the holder terminal 400 may be disposed on an upper surface of the holder 100. The first region 410 of the holder terminal 400 may be electrically connected to the variable lens unit 300. A conductive member may be disposed on an upper surface of the first region 410 of the holder terminal 400. At this time, the conductive member may be Ag epoxy. The first region 410 of the holder terminal 400 and the second region 520 of the first connection terminal 500 may be connected by a conductive member. Or, the first region of the holder terminal 400 and the second region 520 of the first connection terminal 500 may be coupled by a solder. The first region 410 of the holder terminal 400 may be overlapped with the variable lens unit 300 in the direction of an optical axis. The first region 410 of the holder terminal 400 may be formed by being extended more inwardly than the outer end portion of the variable lens unit 300 when viewed from above.

The holder terminal 400 may comprise a second region 420. The second region 420 of the holder terminal 400 may be connected to the first region 410. The second region 420 of the holder terminal 400 may be disposed on the bottom surface of the groove 130 of the holder 100. The second region 420 of the holder terminal 400 may be spaced apart from the cover 800 in a direction perpendicular to the optical axis. Through this, a short circuit (short circuit) between the holder terminal 400 and the cover 800 can be inhibited. An insulating member may be disposed between the second region 420 of the holder terminal 400 and the cover 800.

The second region 420 of the holder terminal 400 may comprise a first portion 421. The first portion 421 may be wider than other portions of the second region 420 of the holder terminal 400. The first portion 421 may be a portion to which a pogo pin is contacted during a manufacturing process or a test process of the camera device according to the present embodiment.

The camera device may comprise a first connection terminal 500. The first connection terminal 500 may be a MID terminal. The first connection terminal 500 may be formed on a surface of the liquid lens holder 320 in a molded interconnection device (MID) method. The first connection terminal 500 may be disposed in the liquid lens holder 320. The first connection terminal 500 may be formed along the surface of the liquid lens holder 320. The first connection terminal 500 may be a component separate from the variable lens unit 300, or the first connection terminal 500 may be a component of the variable lens unit 300. In the present embodiment, it may be possible to design MID patterns on both of an upper side and a lower side, an inner side and an outer side of the liquid lens holder 320.

The first connection terminal 500 may comprise a first terminal 501. The first terminal 501 of the first connection terminal 500 may be electrically connected to the individual terminals of the liquid lens 310. The first connection terminal 500 may comprise a second terminal 502. The second terminal 502 of the first connection terminal 500 may be electrically connected to the common terminal of the liquid lens 310.

The first connection terminal 500 may comprise a plurality of first connection terminals. The first connection terminal 500 may comprise five first connection terminals 500 corresponding to four individual terminals and a common terminal of the liquid lens 310. Furthermore, the first connection terminal 500 may comprise an additional first connection terminal. The first connection terminal 500 may comprise 11 first connection terminals.

The first connection terminal 500 may comprise a first region 510. The first region 510 of the first connection terminal 500 may be disposed on an upper surface or a lower surface of the liquid lens holder 320. The first region 510 of the first connection terminal 500 may be connected to the second connection terminal 600. Each of the first terminal 501 and the second terminal 502 may comprise a first region 510. The first region 510 of the first terminal 501 may be disposed on an upper surface of the liquid lens holder 320. The first region 510 of the second terminal 502 may be disposed on a lower surface of the liquid lens holder 320.

The first connection terminal 500 may comprise a second region 520. The second region 520 of the first connection terminal 500 may be extended from the first region 510 of the first connection terminal 500. The second region 520 of the first connection terminal 500 may be disposed on a side surface of the liquid lens holder 320. The second region 520 may be exposed to the outside. The second region 520 of the first connection terminal 500 may be a portion with which a pogo pin is in contact with in order to apply a current to the liquid lens 310 in the process of aligning the liquid lens 310 with the lens module 200 and/or the image sensor.

The first terminal 501 of the first connection terminal 500 may comprise a third region 530. The third region 530 may be disposed on the opposite side of the first region 510. That is, the first region 510 of the first terminal 501 is disposed on an upper surface of the liquid lens holder 320, and the third region 530 of the first terminal 501 may be disposed on a lower surface of the liquid lens holder 320. The third region 530 may be overlapped with the first region 410 of the holder terminal 400 in an optical axis direction. The third region 530 may face the first region 410 of the holder terminal 400. A conductive member may be disposed between the third region 530 and the first region 410 of the holder terminal 400. The third region 530 is a portion for electrical conduction with the holder terminal 400, and in the case of the second terminal 502 in which the first region 510 is disposed on a lower surface of the liquid lens holder 320, a separate region disposed on the opposite side of the first region 510 may not exist. However, even in this case, it can be understood that the portion that connects the first region 410 and the second region 420 of the second terminal 502 and faces the holder terminal 400 is the third region 530.

The groove 321 of the liquid lens holder 320 may also be formed in a portion corresponding to the third region 530. That is, the liquid lens holder 320 may comprise formed on a lower surface of the liquid lens holder 320, and a groove 321 in which the third region 530 of the first terminal 501 of the first connection terminal 500 is disposed on the bottom surface.

The camera device may comprise a second connection terminal 600. The second connection terminal 600 may be disposed in the liquid lens holder 320. The second connection terminal 600 may electrically connect the first connection terminal 500 and the liquid lens 310. The second connection terminal 600 may connect the terminal of the liquid lens 310 and the first connection terminal 500. The second connection terminal 600 may electrically connect the liquid lens 310, the first connection terminal 500, and the holder terminal 400. The second connection terminal 600 may be connected to the terminal of the liquid lens 310 through the conductive member. The second connection terminal 600 may be in direct contact with the first connection terminal 500. Or, the second connection terminal 600 may be connected to the first connection terminal 500 through a conductive member. The second connection terminal 600 may be connected to the holder terminal 400 through a conductive member. The second connection terminal 600 may comprise a plurality of second connection terminals. Each of the plurality of second connection terminals may be formed in a flat plate shape. In the present embodiment, each of the plurality of second connection terminals may only be extended in a horizontal direction and may not be extended in a direction inclined with respect to the horizontal direction. In the present embodiment, each of the plurality of second connection terminals may not have a bending or bent portion.

The second connection terminal 600 may be disposed in the groove 321 of the liquid lens holder 320 so as not to be protruded more than the liquid lens holder 320. The second connection terminal 600 may not be protruded more in an optical axis direction than the liquid lens holder 320. In the present embodiment, the first connection terminal 500 and the second connection terminal 600 may be formed as separate members and connected by a conductive member. The second connection terminal 600 may be a component separate from the variable lens unit 300, or the second connection terminal 600 may be a component of the variable lens unit 300.

The second connection terminal 600 may comprise a first terminal connected to an individual terminal of the liquid lens 310 and a second terminal connected to a common terminal of the liquid lens 310. The second connection terminal 600 may comprise a first region being connected to the terminal of the liquid lens 310, a second region being connected to the first connection terminal 500, and a third region connecting the first region and the second region.

The second connection terminal 600 may comprise a groove 610. The groove 610 of the second connection terminal 600 may be formed in a lateral end portion of the second connection terminal 600. The groove 610 may be formed as a side surface of the second connection terminal 600 is being recessed. By the groove 610, the contact area with the conductive member being applied to the second connection terminal 600 is enlarged, so that the conductive member can be more stably fixed to the second connection terminal 600.

The camera device according to the present embodiment may use the leaf spring 60 of the form of FIG. 18 in the manufacturing process. The leaf spring 60 may comprise a body portion 61. The leaf spring 60 may comprise a second connection terminal 600. The leaf spring 60 may comprise a leg 62 connecting the body portion 61 and the second connection terminal 600. By cutting the leg 62 in the manufacturing process, the second connection terminal 600 can be used for electrical conduction between the liquid lens 310 and the first connection terminal 500 of the liquid lens holder 320.

Referring to FIG. 19, the liquid lens holder 320 in which the second connection terminal 600 is formed is prepared, and the leaf spring 60 may be disposed thereon. Thereafter, the second connection terminal 600 may be fixed to the first connection terminal 500 through the conductive member 700 and the leg 62 may be cut. Thereafter, the liquid lens 310 may be inserted into the hole 324 of the liquid lens holder 320 from below, and the liquid lens 310 may be fixed to the liquid lens holder 320 with thermosetting epoxy. Thereafter, the second connection terminal 600 may be fixed to the individual terminals of the liquid lens 310 through the conductive member 700. After that, by turning the variable lens unit 300 the common terminal of the liquid lens 310 is coupled to the second connection terminal 600 connecting and the first connection terminal 500 so that the assembling of the variable lens unit 300 can be completed.

The camera device may comprise a cover 800. The cover 800 may cover the holder 100. The cover 800 may be coupled to the holder 100. The cover 800 may be disposed in the step portion 120 of the holder 100. An inner surface of the side plate 820 of the cover 800 may be fixed to a side surface of the holder 100 by an adhesive. The cover 800 may accommodate a portion of the lens module 200 therein. The cover 800 may form an outer appearance of the camera device. The cover 800 may have a hexahedral shape with an open lower surface. The cover 800 may be a non-magnetic material. The cover 800 may be formed of a metal material. The cover 800 may be formed of a metal plate. The cover 800 may be connected to the ground portion of the substrate 10. Through this, the cover 800 may be grounded. The cover 800 may block electromagnetic interference (EMI). At this time, the cover 800 may be referred to as an 'EMI shield can'.

The cover 800 may comprise an upper plate 810 and a side plate 820. The cover 800 may comprise an upper plate 810 comprising a hole, and a side plate 820 being extended downward from an outer circumference of the upper plate 810.

The camera device may comprise a conductive member. The conductive member may comprise Ag epoxy. A conductive member may be conductive. The conductive member may be disposed in an epoxy tank formed in the holder 100. The conductive member can be disposed for bonding between terminals. The conductive member may be viscous. The conductive member may connect the terminal of the liquid lens 310 and the second connection terminal 600. The conductive member may connect the second connection terminal 600 and the first connection terminal 500. The conductive member may connect the first connection terminal 500 and the holder terminal 400. The conductive member may connect the holder terminal 400 and the terminal of the substrate 10.

The present embodiment may comprise a mold interconnect device (MID) type that connects an electronic circuit pattern to a surface of the insert surface of the holder 100 and a MID holder design that connects a leaf spring with an Ag epoxy. The present embodiment is an MID type, and has the advantage of having a high degree of freedom in pattern design even if the number of electrodes of the liquid lens 310 is increased. The present embodiment has the advantage that the MID pattern design is possible through an inner side wall and an outer side wall of the holder 100, so it is easy to design the connection structure between the opposite electrode and the distant electrodes. The present embodiment has a structure that is easy to reduce the size of the holder 100 in the form of a simple mold compared to the insert mold structure.

In the present embodiment, a leaf spring 60 type design can be applied for connection with the liquid lens 310. A leaf spring 60 is attached to the first connection terminal 500 with an Ag epoxy, the liquid lens 310 is inserted, and the space between the inner wall of the liquid lens holder 320 and the outer wall of the liquid lens 310 can be fixed with a heat curing epoxy (thermal epoxy). Thereafter, an Ag epoxy may be attached between the electrode at the opposite side of the liquid lens 310 and the first connection terminal 500.

In the present embodiment, the connection structure between the variable lens unit 300 and the holder 100 can be implemented by attaching the portion that is disposed on the side surface and lower surface of the liquid lens holder 320 among the first connection terminal 500 and the holder terminal 400 with an Ag epoxy.

Through the present embodiment, due to the increase in the degree of design freedom, there is an advantage in that a design that meets the required shape of a customer becomes possible when the size of the liquid lens 310 increases and the number of electrodes increases. For example, customer requirements such as asymmetric structure and size reduction can be reflected.

Hereinafter, a configuration of an optical device according to a second embodiment of the present invention will be described.

Optical devices may be any one among a hand phone, a mobile phone, a smart phone, a portable smart device, a digital camera, a laptop computer, a digital broadcasting terminal, a personal digital assistant (PDA), a portable multimedia player (PMP), and a navigation device. However, the type of the optical device is not limited thereto, and any device for photographing an image or a picture may be comprised in the optical device.

The optical device may comprise a main body. The main body may form an outer appearance of the optical device. The main body can accommodate the camera device. A display unit may be disposed on one surface of the main body. For example, the display unit and the camera device may be disposed on one surface of the main body, and the camera device may be additionally disposed on the other surface of the main body (a surface positioned opposite to one surface).

The optical device may comprise a display unit. The display unit can be disposed on one side of the main body. The display unit can output an image photographed by the camera device.

The optical device may comprise a camera device. The camera device can be disposed in the main body. At least a portion of the camera device can be accommodated inside the main body. A plurality of camera devices may be provided. The camera device may be disposed on one side of the main body and the other side of the main body, respectively. The camera device may photograph an image of a subject.

Hereinafter, a configuration of a camera device according to a second embodiment of the present invention will be described with reference to the drawings.

Figure 21:
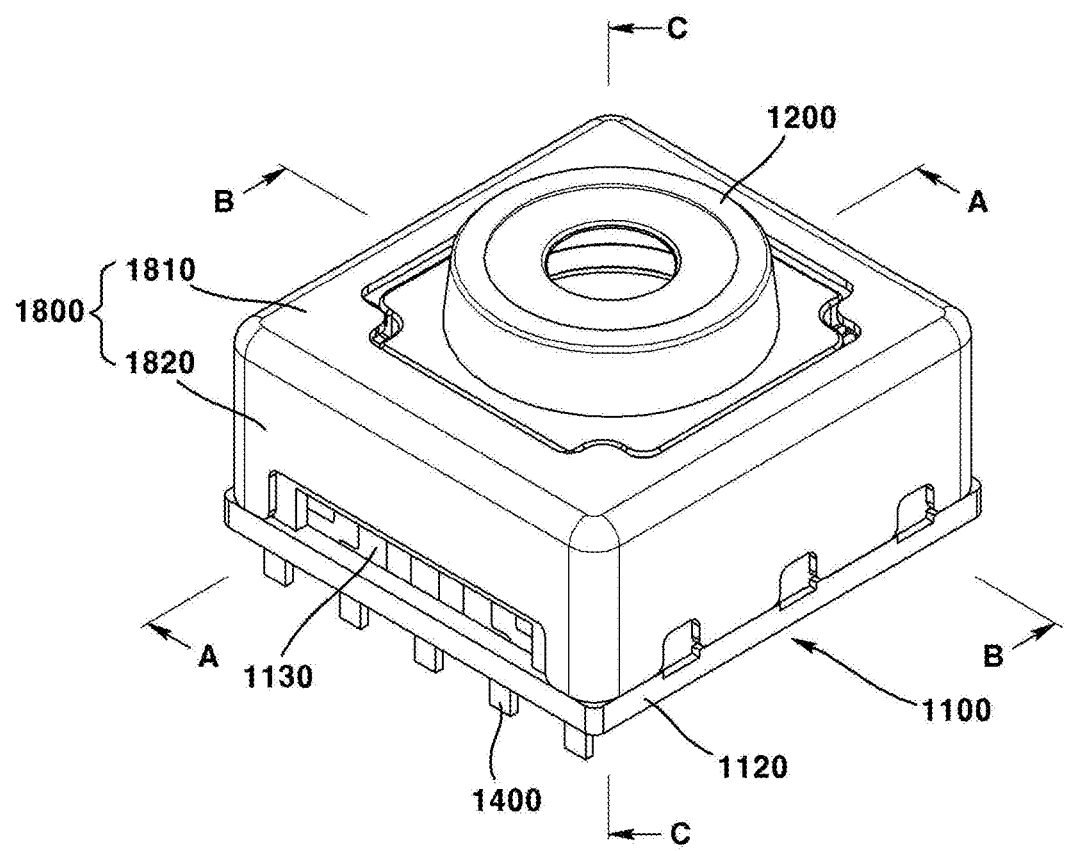
FIG. 21 is a perspective view of a partial configuration of a camera device according to a second embodiment of the present invention.
Figure 22:
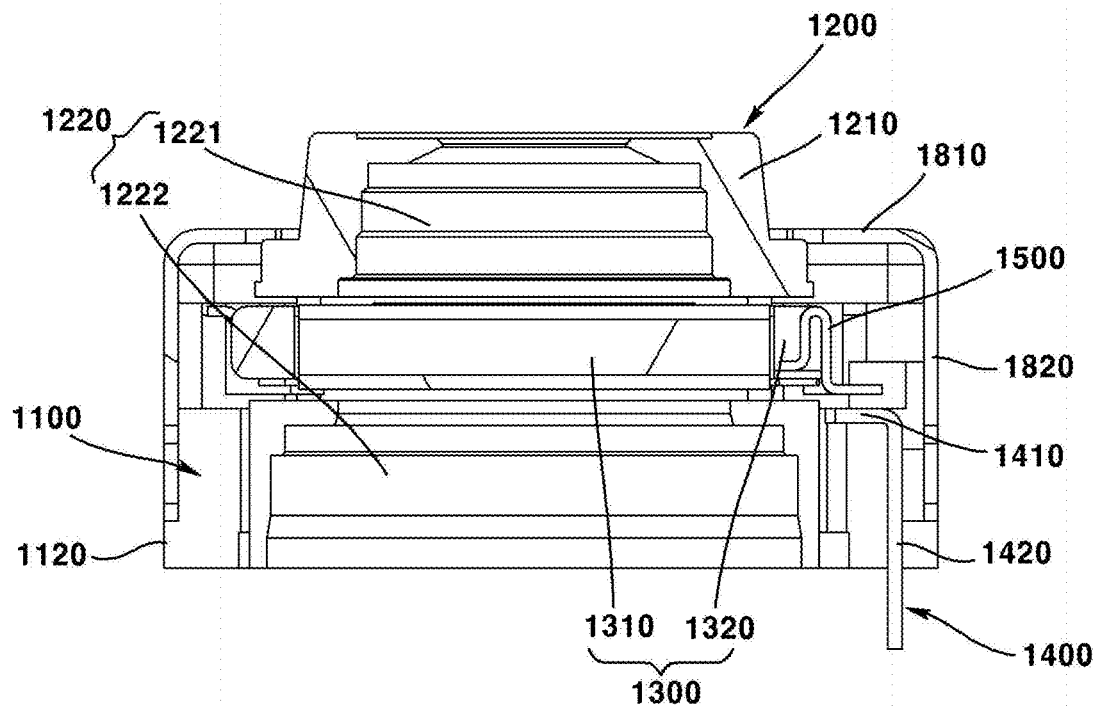
FIG. 22 is a cross-sectional view taken along line A-A of FIG. 21.
Figure 23:
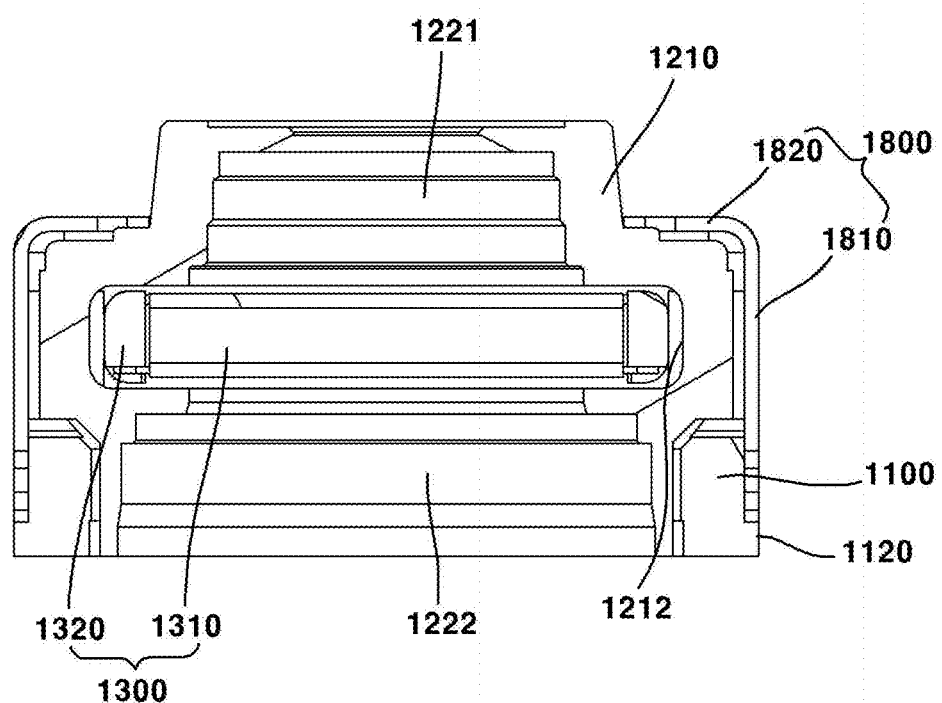
FIG. 23 is a cross-sectional view taken along line B-B of FIG. 21.
Figure 24:
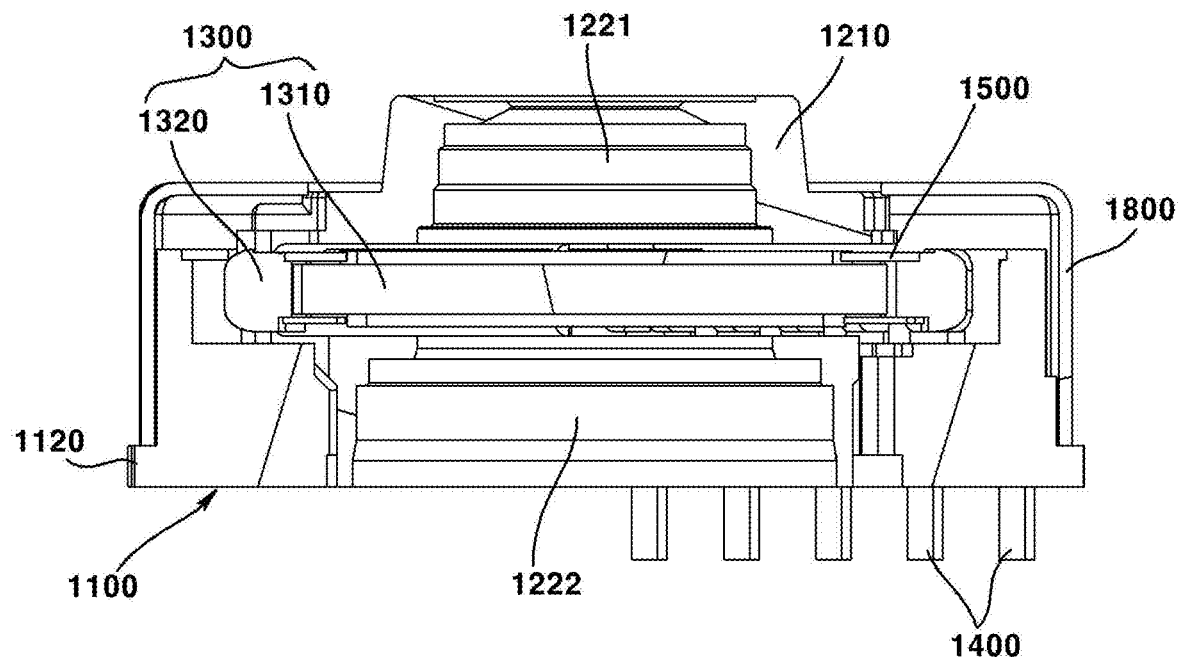
FIG. 24 is a cross-sectional view taken along line C-C of FIG. 21.
Figure 25:
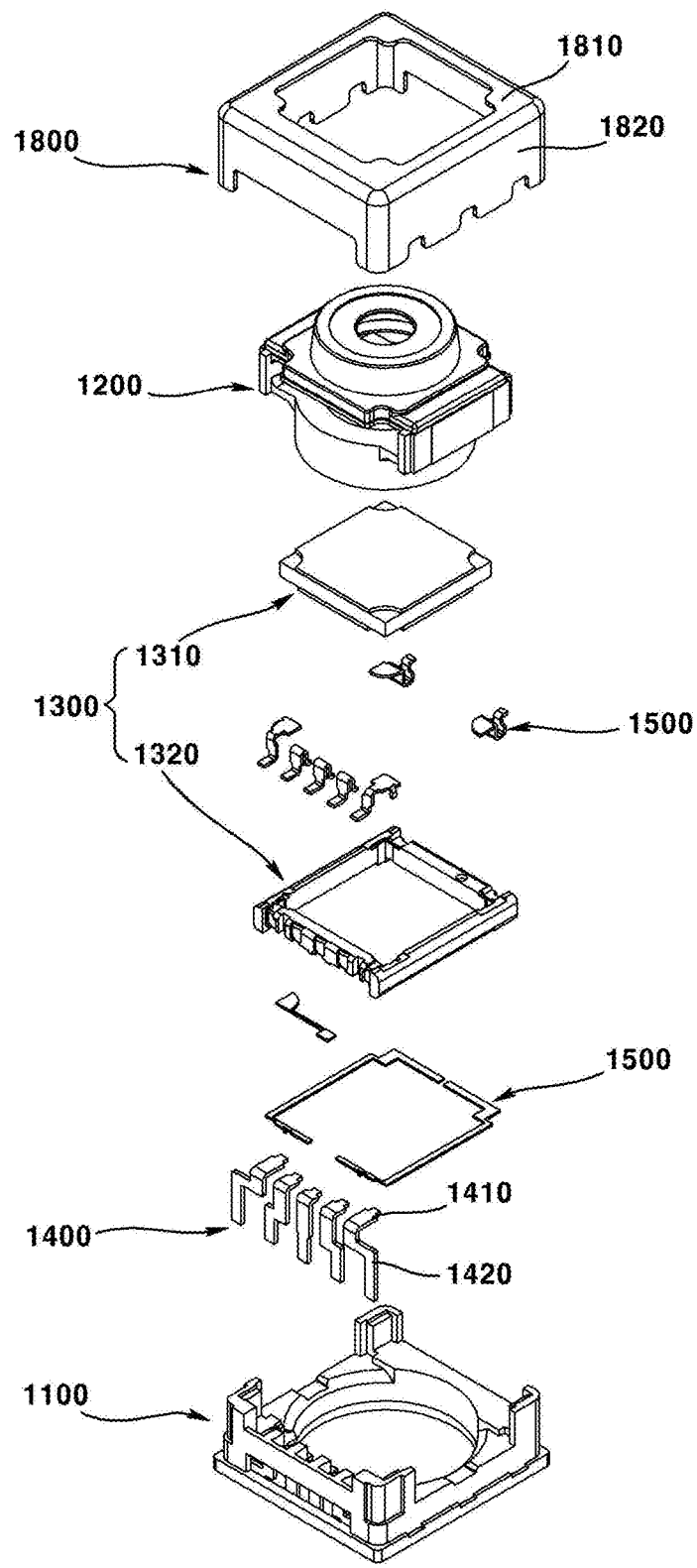
FIG. 25 is an exploded perspective view of a partial configuration of a camera device according to a second embodiment of the present invention.
Figure 26:
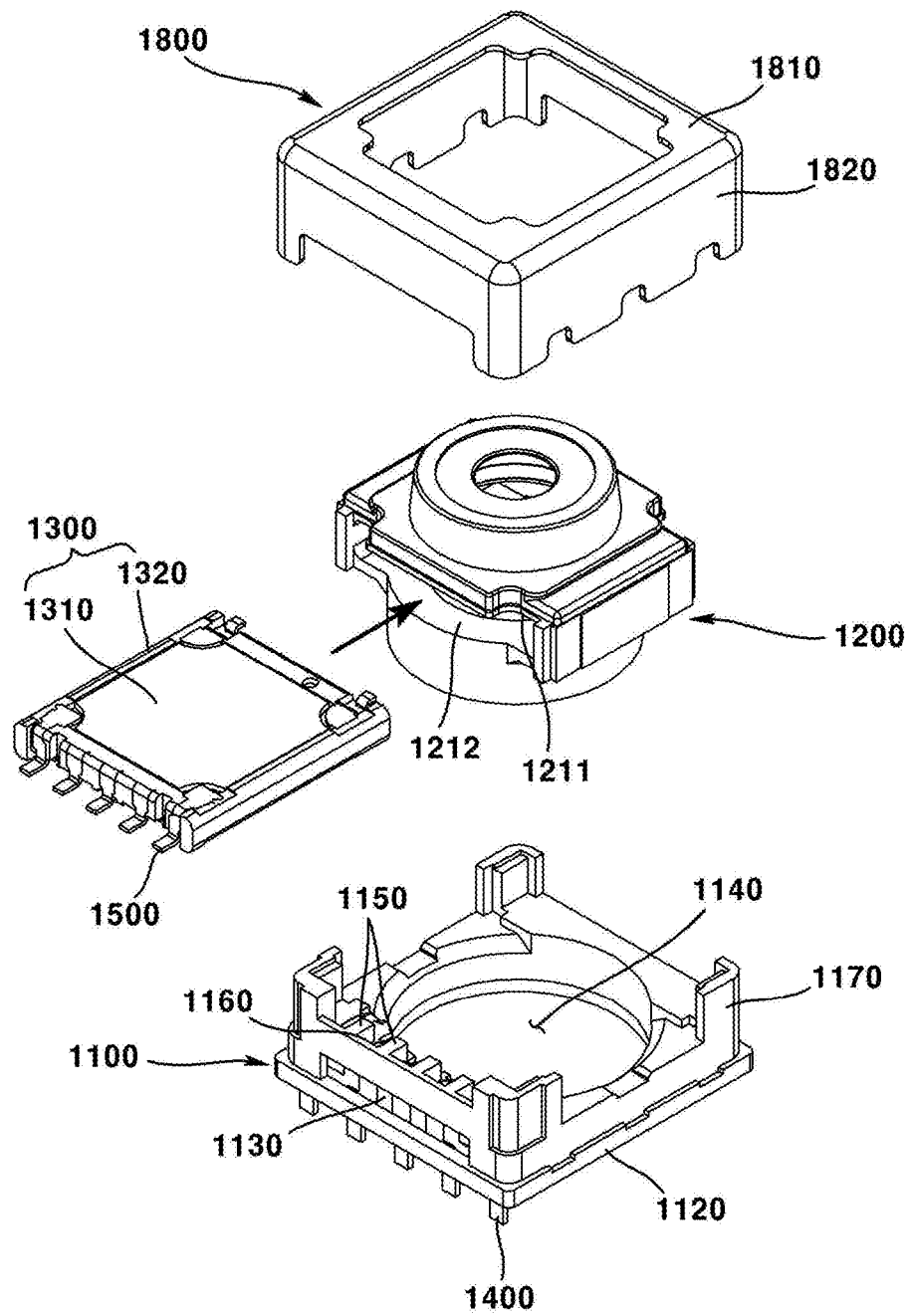
FIG. 26 is an exploded perspective view of a partial configuration of a camera device according to a second embodiment of the present invention.
Figure 27:
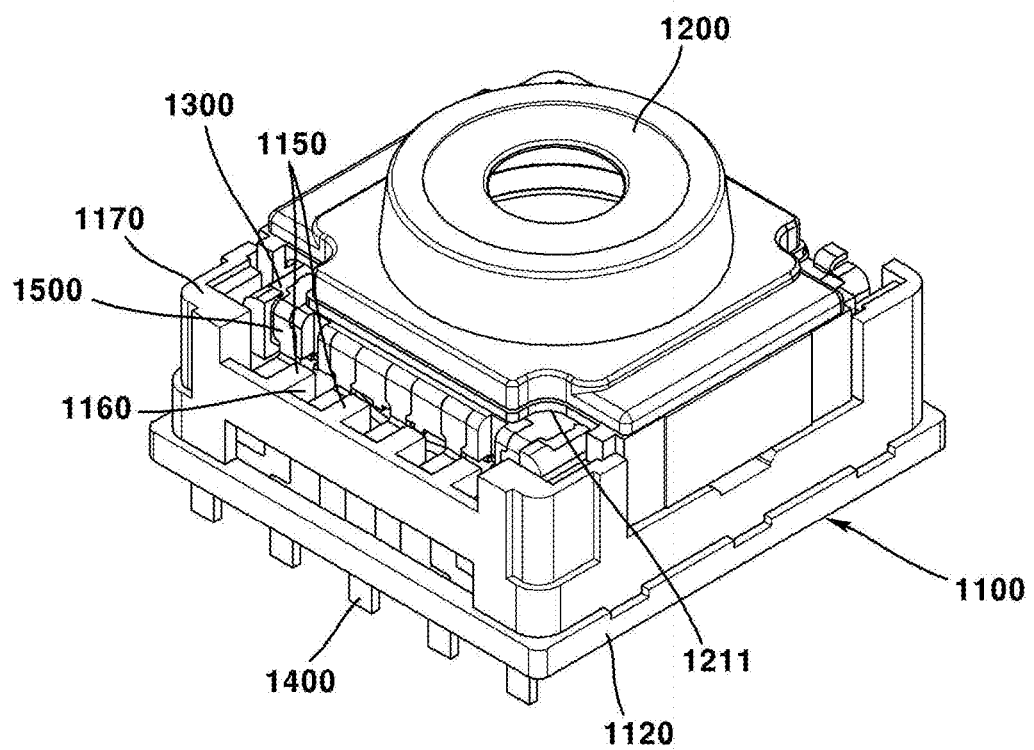
FIG. 27 is a perspective view of a partial configuration of the camera device in a state in which the cover is removed from FIG. 21.
Figure 28:
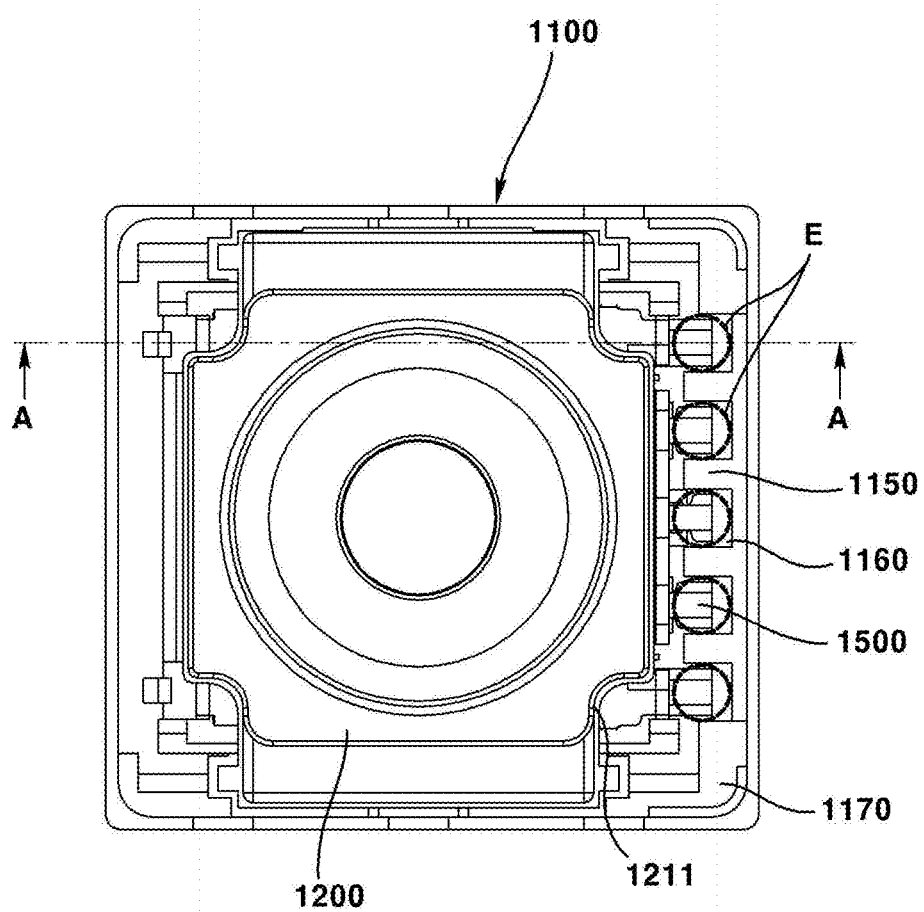
FIG. 28 is a plan view of a partial configuration of the camera device of FIG. 27.
Figure 29:
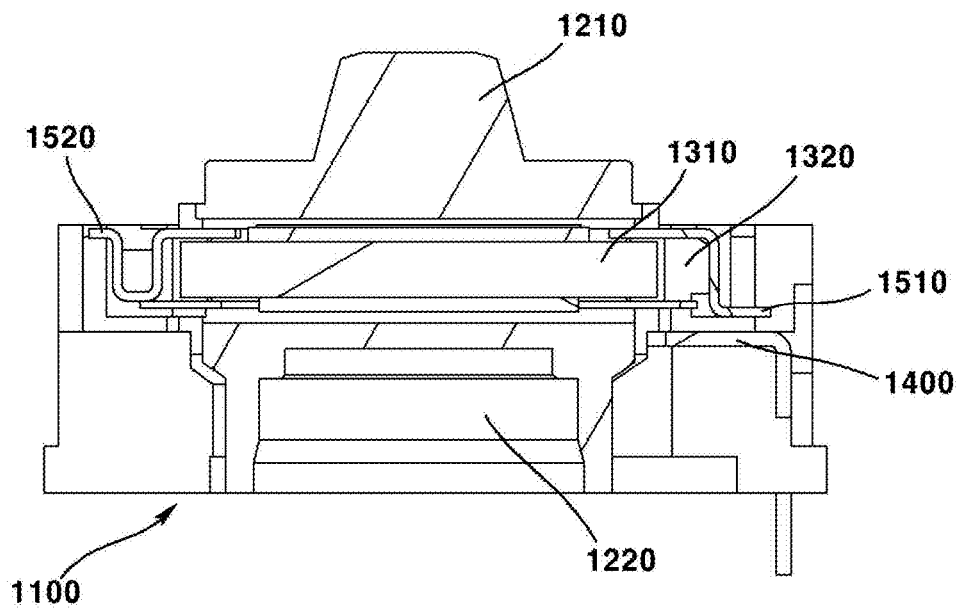
FIG. 29 is a cross-sectional view taken along line A-A of FIG. 28.
Figure 30:
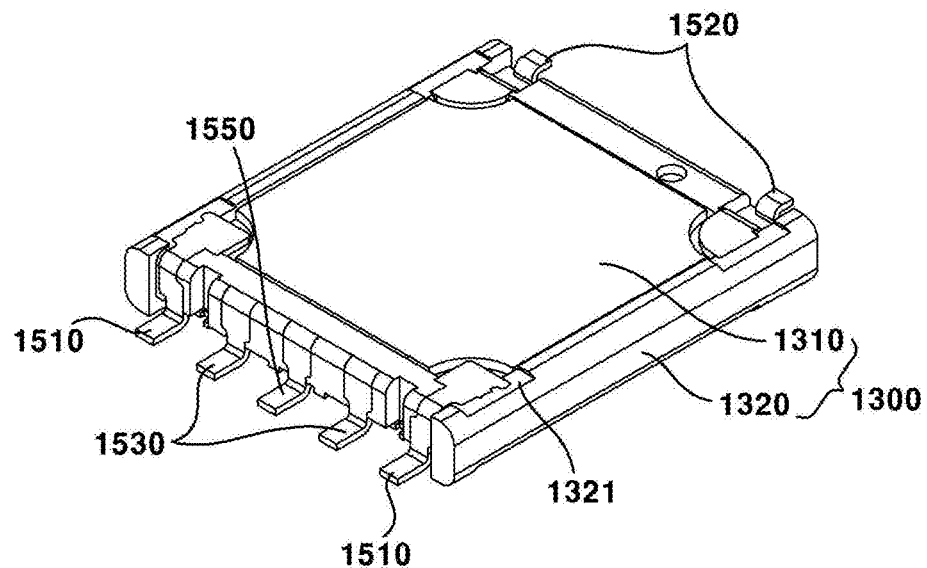
FIG. 30 is a perspective view illustrating a coupling state of a variable lens unit and a connection terminal according to a second embodiment of the present invention.
Figure 31:
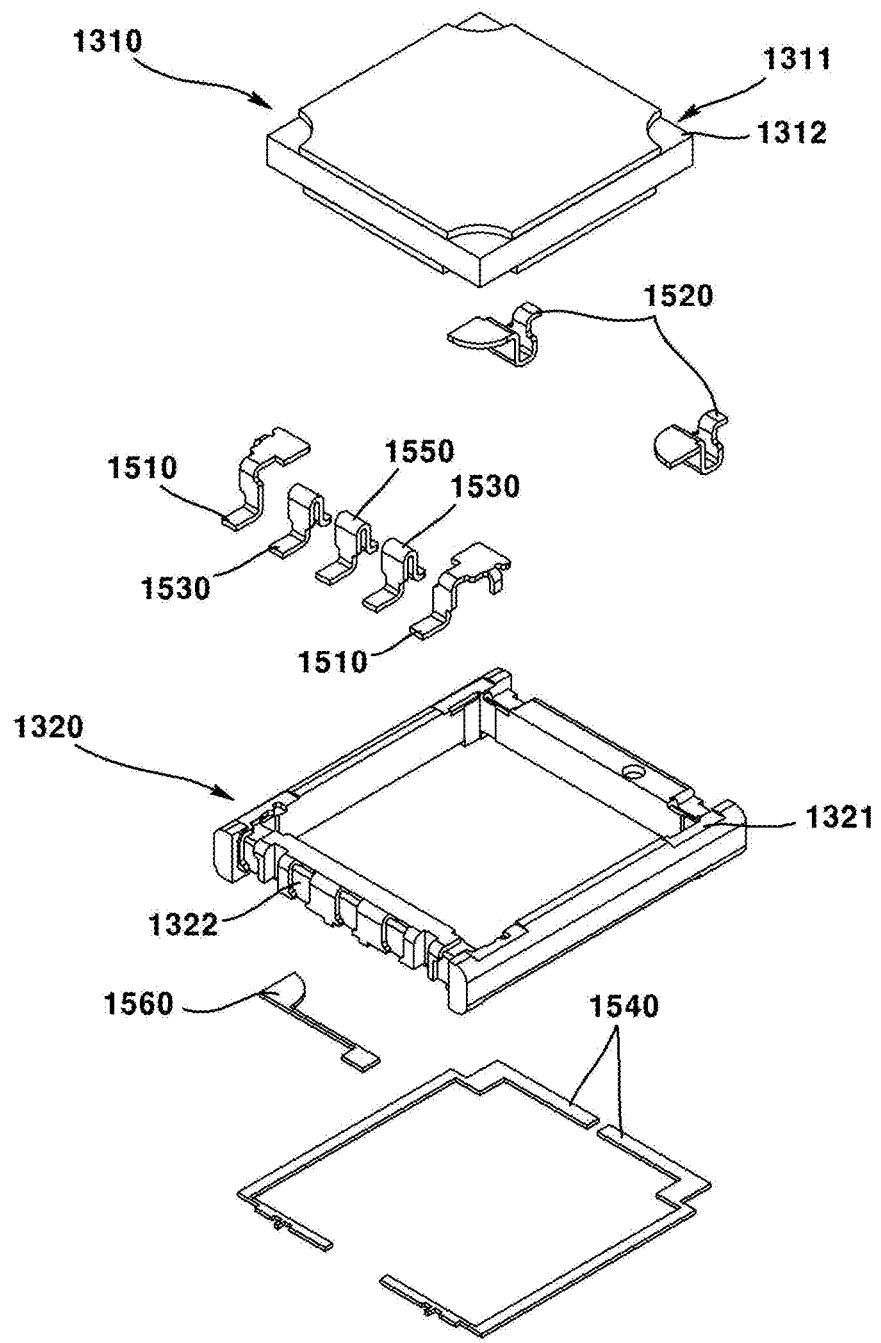
FIG. 31 is an exploded perspective view of a partial configuration of the camera device of FIG. 30.
Figure 32:
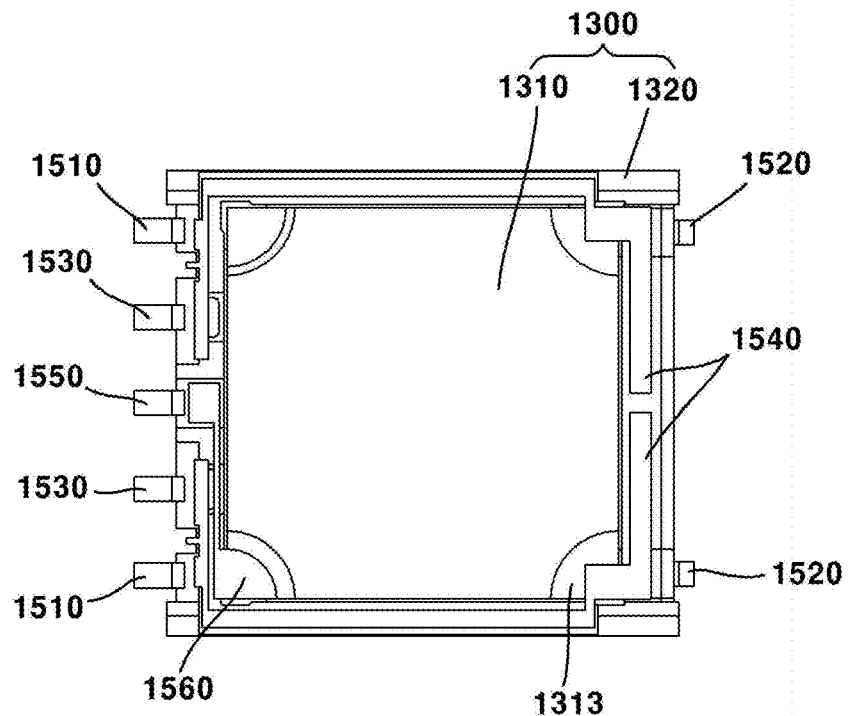
FIG. 32 is a bottom view of the partial configuration of the camera device of FIG. 30.
Figure 33:
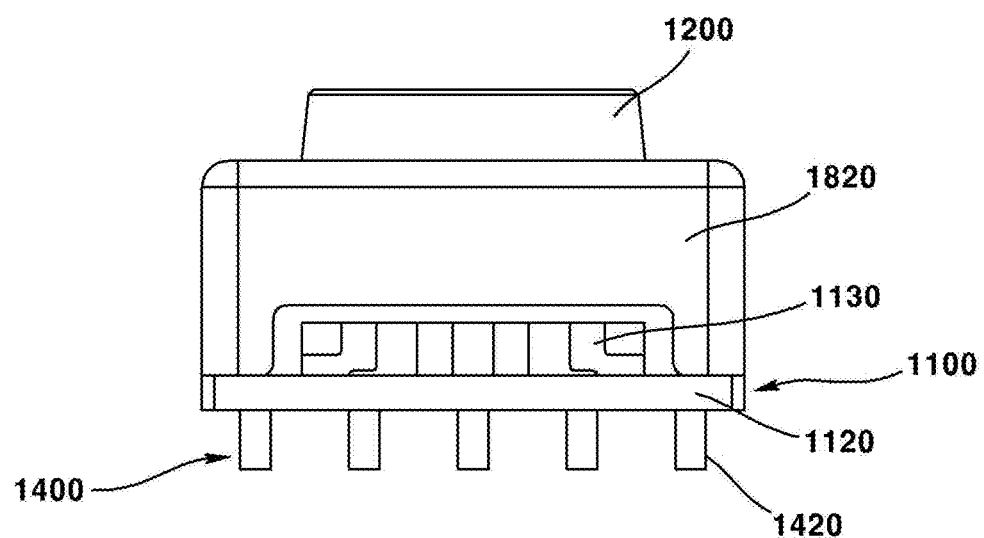
FIG. 33 is a front view of a partial configuration of a camera device according to a second embodiment of the present invention.
Figure 35:
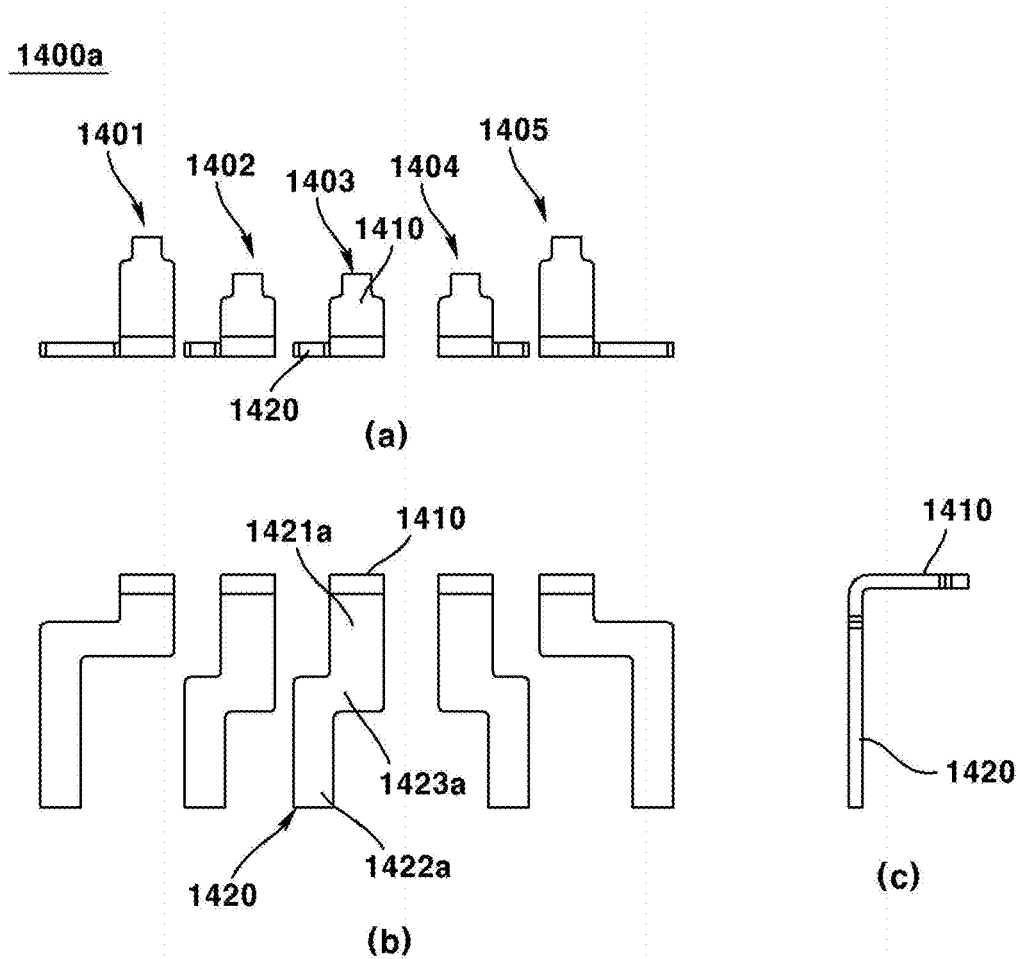
FIG. 35 (a) is a plan view illustrating a top view of a holder terminal according to a first modified embodiment, (b) is a front view, and (c) is a side view.
Figure 40:
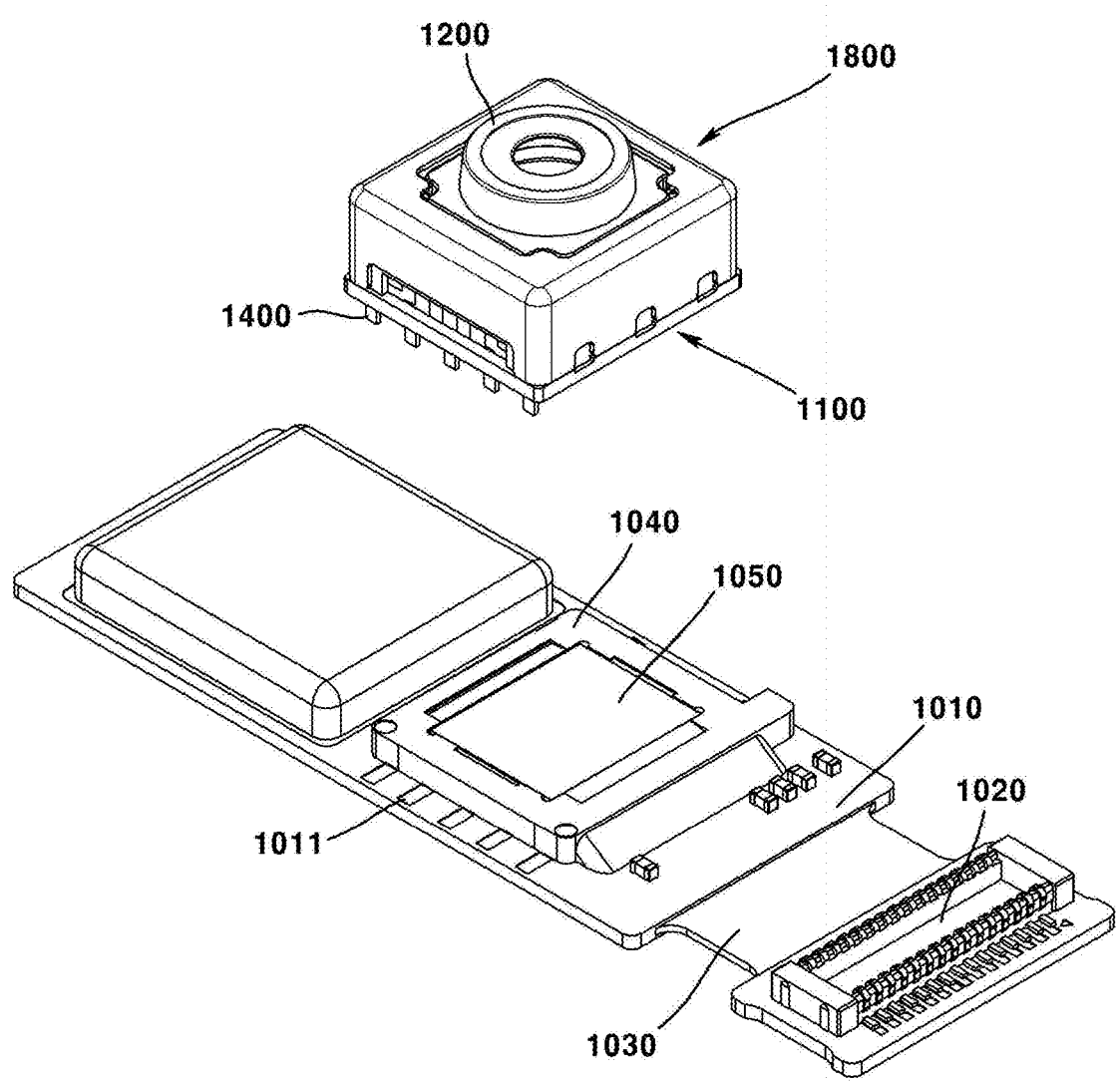
FIG. 40 is an exploded perspective view of a camera device according to a second embodiment of the present invention.

FIG. 21 is a perspective view of a partial configuration of a camera device according to a second embodiment of the present invention; FIG. 22 is a cross-sectional view taken along line A-A of FIG. 21; FIG. 23 is a cross-sectional view taken along line B-B of FIG. 21; FIG. 24 is a cross-sectional view taken along line C-C of FIG. 21; FIG. 25 is an exploded perspective view of a partial configuration of a camera device according to a second embodiment of the present invention; FIG. 26 is an exploded perspective view of a partial configuration of a camera device according to a second embodiment of the present invention; FIG. 27 is a perspective view of a partial configuration of the camera device in a state in which the cover is removed from FIG. 21; FIG. 28 is a plan view of a partial configuration of the camera device of FIG. 27; FIG. 29 is a cross-sectional view taken along line A-A of FIG. 28; FIG. 30 is a perspective view illustrating a coupling state of a variable lens unit and a connection terminal according to a second embodiment of the present invention; FIG. 31 is an exploded perspective view of a partial configuration of the camera device of FIG. 30; FIG. 32 is a bottom view of the partial configuration of the camera device of FIG. 30; FIG. 33 is a front view of a partial configuration of a camera device according to a second embodiment of the present invention; FIG. 34 (*a*) is a plan view illustrating a top view of a holder terminal according to a second embodiment of the present invention, (b) is a front view, and (c) is a side view; FIG. 35 (*a*) is a plan view illustrating a top view of a holder terminal according to a first modified embodiment, (b) is a front view, and (c) is a side view; FIG. 36 (*a*) is a plan view illustrating a top view of a holder terminal according to a second modified embodiment, (b) is a front view, and (c) is a side view; FIG. 37 (*a*) is a plan view illustrating a top view of a holder terminal according to a third modified embodiment, (b) is a front view, and (c) is a side view; FIG. 38 (*a*) is a plan view illustrating a top view of a holder terminal according to a fourth modified embodiment, (b) is a front view, and (c) is a side view; FIG. 39 (*a*) is a plan view illustrating a top view of a holder terminal according to a fifth modified embodiment, (b) is a front view, and (c) is a side view; and FIG. 40 is an exploded perspective view of a camera device according to a second embodiment of the present invention.

The camera device may comprise a substrate 1010. The substrate 1010 may be a printed circuit board (PCB). The substrate 1010 may comprise an upper surface. The image sensor and the sensor holder 1040 may be disposed on an upper surface of the substrate 1010. The substrate 1010 may comprise a terminal 1011. The terminal 1011 of the substrate 1010 may be electrically connected to the holder terminal 1400 through a conductive member.

The camera device may comprise an image sensor. The image sensor may be disposed in the substrate 1010. The image sensor may be disposed in the substrate 1010. The image sensor may be disposed on an upper surface of the substrate 1010. The image sensor may be electrically connected to the substrate 1010. For example, the image sensor may be coupled to the substrate 1010 by a surface mounting technology (SMT). As another example, the image sensor may be coupled to the substrate 1010 by a flip chip technology. The image sensor may be disposed so that the lens 1220 and the optical axis coincide. That is, an optical axis of the image sensor and an optical axis of the lens 1220 may be aligned. The image sensor may convert light irradiated to an effective image region of the image sensor into an electrical signal. The image sensor may be any one among a charge coupled device (CCD), a metal oxide semi-conductor (MOS), a CPD, and a CID.

The camera device may comprise a connector 1020. The connector 1020 may be connected to the board 1010 through the connection substrate 1030. The connector 1020 may comprise a port for electrically connecting to an external device.

The camera device may comprise a sensor holder 1040. The sensor base 1040 may be disposed between the holder 1100 and the substrate 1010. The filter 1050 may be disposed in the sensor holder 1040. An opening may be formed in a portion of the sensor holder 1040 in which the filter 1050 is disposed so that light passing through the filter 1050 may be incident on the image sensor.

The camera device may comprise a filter 1050. The filter 1050 may comprise an infrared filter. The infrared filter may block light of the infrared region from being incident on the image sensor. An infrared filter may reflect infrared radiation. Or, the infrared filter may absorb infrared radiation. The infrared filter may be disposed between the lens module 1200 and the image sensor. The infrared filter may be disposed in the sensor holder 1040.

The camera device may comprise a holder 1100. The holder 1100 may be disposed to in the substrate 1010. The holder 1100 may be disposed in the sensor holder 1040. The holder 1100 may be disposed on an upper surface of the sensor holder 1040. The holder 1100 may be coupled to the sensor holder 1040. The holder 1100 may be coupled to the lens module 1200. The holder 1100 may be disposed inside the cover 1800. The holder 1100 may be formed of an insulating material.

The holder 1100 may comprise a step portion 1120. The step portion 1120 may be protruded from a side surface of the holder 1100. The step portion 1120 may be formed on the outer circumference of the holder 1100. A side plate 1820 of the cover 1800 may be disposed in the step portion 1120. The step portion 1120 may be overlapped with the side plate 1820 of the cover 1800 in a direction parallel to an optical axis (vertical direction).

The holder 1100 may comprise a groove 1130. The groove 1130 may be formed in the side surface of the holder 1100. The groove 1130 may be recessed from the side surface of the holder 1100 to the side surface of the holder terminal 1400. Through this, the groove 1130 may expose at least a portion of the side surface of the holder terminal 1400.

The holder 1100 may comprise a hole 1140. The hole 1140 may be a hollow hole penetrating the holder 1100 in an optical axis direction. The lens module 1200 may be disposed in the hole 1140.

The holder 1100 may comprise a partition wall 1150. The partition wall 1150 may be protruded from an upper surface of the holder 1100. The partition wall 1150 may be disposed between the plurality of holder terminals 1400. The partition wall 1150 may be provided in plurality to form an epoxy tank in which Ag epoxy is accommodated. That is, an epoxy tank may be formed between the plurality of partition walls 1150. In the present embodiment, the epoxy tank can be described as being formed as the partition wall 1150 is being protruded from an upper surface of the holder 1100. Or, the epoxy tank may be described to be formed by a groove into which a portion of an upper surface of the holder 1100 is being recessed. In the present embodiment, an epoxy tank, which is a space in which the epoxy is accommodated, is formed between the plurality of partition walls 1150, and this portion can be referred to as a groove. A conductive member may be disposed between the partition walls 1150. Ag epoxy may be disposed between the partition walls 1150.

The holder 1100 may comprise a pillar 1170. The pillar 1170 may be protruded from the upper surface of the holder 1100. The pillar 1170 may be formed at each of the four corners of the holder 1100. The four pillars 1170 may inhibit the phenomenon in which the variable lens unit 1300 and the lens module 1200 disposed inside are separated. The pillar 1170 may be coupled to the cover 1800

The camera device may comprise a lens module 1200. The lens module 1200 may be coupled to the holder 1100. The lens module 1200 may be disposed in the holder 1100. The lens module 1200 may be coupled to the holder 1100.

The lens module 1200 may comprise a lens holder 1210. The lens holder 1210 may be a lens barrel. The lens holder 1210 may be coupled to the holder 1100. The lens holder 1210 may be disposed in the holder 1100. The lens holder 1210 may accommodate the lens therein. The inner circumferential surface of the lens holder 1210 may be formed in a shape corresponding to the outer circumferential surface of the lens 1220. The lens holder 1210 may be formed of an insulating material.

The lens holder 1210 may comprise a groove 1211. The groove 1211 may comprise an avoidance portion or a cutout portion. The groove 1211 may be formed at a corner of the lens module 1200. The groove 1211 may expose a portion of an upper surface of the liquid lens holder 1320. An adhesive for fixing the liquid lens holder 1320 to the lens module 1200 may be disposed in the groove 1211. In the present embodiment, a groove 1211 may be formed in the lens holder 1210 to facilitate the adhesive application between the lens module 1200 and the liquid lens holder 1320 according to the minimization of the size of the liquid lens holder 1320.

The lens holder 1210 may comprise a hole 1212. The hole 1212 may be a variable lens accommodation hole in which the variable lens unit 1300 is disposed. The variable lens unit 1300 may be disposed in the hole 1212. The hole 1212 may be formed to have a height greater than the height of the variable lens unit 1300 by a predetermined size. The hole 1212 may penetrate through the lens module 1200 in a direction perpendicular to the optical axis. The liquid lens 1310 may be horizontally inserted into the hole 1212 of the lens module 1200 and coupled thereto.

The lens module 1200 may comprise a lens 1220. The lens 1220 may be disposed in the lens holder 1210. The lens may be a solid lens. The lens may be a plastic lens. The lens 1220 may comprise a plurality of lenses. The lens 1220 may comprise an upper lens 1221 and a lower lens 1222. The upper lens 1221 may be disposed at an upper side of the liquid lens 1310. The lower lens 1222 may be disposed at a lower side of the liquid lens 1310. Each of the upper lens 1221 and the lower lens 1222 may comprise a plurality of lenses. The upper lens 1221 may comprise three or two lenses, and the lower lens 1222 may comprise two or three lenses. However, the number of lenses of the upper lens 1221 and the number of lenses of the lower lens 1222 are not limited thereto. Although the lens 1220, the upper lens 1221, and the lower lens 1222 are illustrated in the drawings, the corresponding reference numerals may correspond to a space, not a lens, in which a lens is accommodated.

The camera device may comprise a variable lens unit 1300. The variable lens unit 1300 may be coupled to the lens module 1200. The variable lens unit 1300 may be coupled to the lens holder 1210. The variable lens unit 1300 may be disposed in the lens holder 1210. The variable lens unit 1300 may be spaced apart from the holder 1100. The variable lens unit 1300 may be aligned with the lens 1220 and the image sensor. The variable lens unit 1300 may be fixedly inserted into the lens module 1200 in a horizontal direction.

The variable lens unit 1300 may comprise a variable lens. The variable lens may be a variable focus lens. The variable lens may be a lens whose focus can be adjusted. The focus may be adjusted by moving the lens and/or changing the shape of the lens. The variable lens unit liquid lens 1310, may comprise any one or more among polymer lenses, liquid crystal lenses, VCM (voice coil motor) actuators, SMA (shape memory alloy) actuators, and MEMS (micro electro mechanical systems) actuators.

The liquid lens 1310 may comprise at least one of a liquid lens 1310 comprising one type of liquid and a liquid lens 1310 comprising two types of liquids. The liquid lens 1310 comprising one type of liquid may change the focus by adjusting a membrane being disposed at a position corresponding to the liquid. For example, the focus can be changed by pressing the membrane by the electromagnetic force of the magnet and coil. The liquid lens 1310 comprising two types of liquids may comprise a conductive liquid and a non-conductive liquid. In this case, the focus may be changed by adjusting the interface formed between the conductive liquid and the non-conductive liquid by using the voltage applied to the liquid lens 1310.

The polymer lens can change the focus by adjusting a polymer material through a driving unit such as a piezo. The liquid crystal lens can change the focus by controlling the liquid crystal by electromagnetic force. The VCM actuator can change focus by moving a solid lens or a lens assembly comprising a solid lens through electromagnetic force between a magnet and a coil. The SMA actuator may change the focus by moving a solid lens or a lens assembly comprising the solid lens using a shape memory alloy. The MEMS actuator may change a focus by moving a solid lens or a lens assembly comprising the solid lens through electrostatic force generated when voltage is applied.

The variable lens unit 1300 may comprise a liquid lens 1310. The liquid lens 1310 may be disposed in the lens module 1200. The liquid lens 1310 may be disposed in the liquid lens holder 1320. The liquid lens 1310 may be disposed between the plurality of lenses 1220. The liquid lens 1310 may be disposed between the upper lens 1221 and the lower lens 1222. The liquid lens 1310 may be disposed in the hole 1212 of the lens module 1200.

The liquid lens 1 whose focal length is adjusted in response to a driving voltage may receive an operating voltage through a terminal. The terminal of the liquid lens 1310 may comprise an individual terminal 1312 and a common terminal 1313 The individual terminal 1312 may comprise four individual terminals disposed at the four corners of the liquid lens 1310. The individual terminals may be disposed on an upper surface of the liquid lens 1310. At this time, individual terminals 1312 can be called upper terminals. The common terminal 1313 may comprise four common terminals disposed at the four corners of the liquid lens 1310. The common terminals may be disposed on a lower surface of the liquid lens 1310. At this time, the common terminals 1313 may be called lower terminals. When an operating voltage is applied through the individual terminals 1312 and the common terminals 1313, the interface between the conductive liquid and the non-conductive liquid disposed in the lens region may be deformed.

The liquid lens 1310 may be spaced apart from the solid lens. In the present embodiment, an epoxy may be applied to a separation space between the liquid lens 1310 and the solid lens. At this time, active alignment between the liquid lens 1310 and the solid lens may be performed. Active alignment between the liquid lens 1310 and the solid lens may be performed through the following steps. First, the liquid lens 1310 may be disposed on the solid lens and the assembly of the liquid lens 1310 and the solid lens may be disposed above the master sensor. Thereafter, while moving the liquid lens 1310 above a virtual grid pattern and applying voltages assigned to a plurality of codes to the liquid lens 1310, a point with the greatest amount of light detected by the master sensor may be determined. When the point with the greatest amount of light is determined, the liquid lens 1310 is positioned at the corresponding point, and the epoxy for attaching the liquid lens 1310 to the solid lens can be pre-cured through ultraviolet rays. Thereafter, the liquid lens 1310 may be fixed to the solid lens by main curing the epoxy through heat.

Meanwhile, the lens unit formed by fixing the liquid lens 1310 to the solid lens may be actively aligned with the image sensor. While the lens unit is moved above the virtual grid and voltages assigned to a plurality of codes are applied to the liquid lens 1310, the point where the amount of light detected by the image sensor is greatest can be determined, and the lens unit can be fixed at the corresponding point. At this time, like the coupling of the liquid lens 1310 and the solid lens above, the lens unit can be fixed in place through pre-curing and main curing using epoxy.

Furthermore, although it has been described above that the liquid lens 1310 is first actively aligned with the solid lens and the assembly of the liquid lens 1310 and the solid lens is actively aligned with the image sensor, the solid lens and the image sensor may be first actively aligned and then the liquid lens 1310 may be actively aligned, or the liquid lens 1310 and the image sensor may be first actively aligned and then the solid lens may be actively aligned.

One side of the liquid lens 1310 may receive a voltage from an individual terminal 1312. The other side of the liquid lens 1310 may receive a voltage from a common terminal 1313. In the present embodiment, the individual terminal 1312 of the liquid lens 1310 may be an individual electrode and the common terminal 1313 may be a common electrode. In the liquid lens 1310, the interface formed between the conductive liquid and the non-conductive liquid may be deformed by current and/or voltage applied to the individual terminal 1312 and the common terminal 1313. Through this, any one or more of the AF function and the OIS function may be performed.

The liquid lens 1310 may comprise a terminal 1311. The terminal 1311 may comprise a plurality of terminals. The terminal 1311 may comprise an individual terminal 1312 formed on an upper surface of the liquid lens 1310 and a common terminal 1313 formed on a lower surface of the liquid lens 1310. Each of the individual terminal 1312 and the common terminal 1313 may be formed at each of the four corners of the liquid lens 1310. The liquid lens 1310 may comprise four individual terminals 1312 and a common terminal 1313. Although the common terminal 1313 is formed of four, only one of the four common terminals 1313 may electrically conduct with the outside (electrical conduction).

The variable lens unit 1300 may comprise a liquid lens holder 1320. The liquid lens holder 1320 may be coupled to the liquid lens 1310. The lower surface of the liquid lens holder 1320 may be disposed higher than the upper surface of the holder 1100. The liquid lens 1310 may be disposed inside the liquid lens holder 1320. In the liquid lens holder 1320, the first connection terminal 1500 may be integrally formed by a molded interconnection device (MID) method or insert injection. The variable lens unit 1300 may comprise a variable lens holder. The description of the variable lens holder may be analogously applied to the description of the liquid lens holder 1320.

The liquid lens holder 1320 may comprise a first groove 1321 being formed on an upper surface of the liquid lens holder 1320. The connection terminal 1500 may be disposed in the first groove 1321. However, the first groove 1321 may be formed to be larger than the connection terminal 1500. The first groove 1321 may comprise a plurality of first grooves. Some of the plurality of first grooves may be open toward the side surface of the liquid lens holder 1320.

The liquid lens holder 1320 may comprise a second groove 1322 formed on a side surface of the liquid lens holder 1320. The connection terminal 1500 may be disposed in the second groove 1322. The second groove 1322 may be formed to correspond to the connection terminal 1500. The second groove 1322 may comprise a plurality of second grooves. The second groove 1322 may be formed in a number corresponding to the number of connection terminals 1500.

The camera device may comprise a holder terminal 1400. The holder terminal 1400 may be disposed in the holder 1100. The holder terminal 1400 may be integrally formed on an outer surface of the holder 1100 through a molded interconnection device (MID) method. The holder terminal 1400 may be exposed on a portion of the upper surface of the groove 1110 of the holder 1100. The holder terminal 1400 may electrically connect the connection terminal 1500 and the substrate 1010. The holder terminal 1400 may be formed of an electrically conductive material. The holder terminal 1400 may be formed of metal.

The holder terminal 1400 may comprise a plurality of holder terminals 1400. The plurality of holder terminals 1400 may comprise four individual terminals 1312 of the liquid lens 1310 and five holder terminals 1400 coupled to the common terminal 1313. At this time, the five holder terminals 1400 may be paired with the four individual terminals 1312 and one common terminal 1313 of the liquid lens 1310 so as to be coupled. That is, the plurality of holder terminals 1400 may comprise first to fifth holder terminals 1401, 1402, 1403, 1404, and 1405. In the present embodiment, the first to fifth holder terminals 1401, 1402, 1403, 1404, and 1405 may be formed symmetrically with respect to a virtual straight line passing through the center of the third holder terminal 1403.

The side surface of the holder 1100 may comprise a plurality of side surfaces. At this time, the second portion 1420 of the five holder terminals 1400 may be disposed on one side surface of the plurality of side surfaces of the holder 1100. All of the second portions 1420 of the plurality of holder terminals 1400 may be disposed to only one side surface among the plurality of side surfaces of the holder 1100.

The side surface of the holder 1100 may comprise a first side surface and a second side surface that are disposed on opposite sides, and a third side surface and a fourth side surface that connect the first side surface and the second surface and are disposed on opposite sides. At this time, the second portion 1420 of the five holder terminals 1400 may be disposed on the first side surface of the holder 1100. In addition, the holder terminal 1400 may not be disposed on the second to fourth side surfaces of the holder 1100. In the present embodiment, the holder terminal 1400 may be disposed only on one side of the holder 1100. Through this, the size of the camera device according to the present embodiment in a direction perpendicular to the optical axis can be minimized compared to the comparative example in which the holder terminal 1400 is disposed at both sides of the holder 1100. Through this, it is possible to secure a space in the horizontal direction to reduce the size of one side end of the module and reduce the bezel width of the optical device.

The holder terminal 1400 may comprise a first portion 1410. The first portion 1410 may be connected to the connection terminal 1500 through a conductive member. The conductive member may comprise an electrically conductive epoxy E exemplarily illustrated in FIG. 28. The first portion 1410 may be disposed on an upper surface of the holder 1100. An upper surface of the first portion 1410 may be exposed upward to be in contact with the conductive member. The first portion 1410 of the holder terminal 1400 may be overlapped with the connection terminal 1500 in an optical axis direction.

The holder terminal 1400 may comprise a second portion 1420. The second portion 1420 may be extended from the first portion 1410. The second portion 1420 may be formed by bending downward from the first portion 1410. The second portion 1420 may be integrally formed with the first portion 1410. The second portion 1420 may be disposed on a side surface of the holder 1100. A side surface of the second portion 1420 may be exposed to the outside.

The lower ends of the second portions 1420 of the plurality of holder terminals 1400 may be electrically connected to the substrate 1010 by soldering. In the present embodiment, the distance between the lower ends of the second portions 1420 of the plurality of holder terminals 1400 (refer to P2 of FIG. 34) may be longer than the distance (refer to P1 in FIG. 34) between the upper ends of the second portions 1420 of the plurality of holder terminals 1400. In the present embodiment, the pitch or distance between the lower ends of the second portions 1420 of the plurality of holder terminals 1400 may be longer than a pitch or distance between the upper ends of the second portions 1420 of the plurality of holder terminals 1400. Through this, interference between the plurality of solders connecting the plurality of holder terminals 1400 to the substrate 1010, respectively, may be inhibited.

The second portion 1420 of the holder terminal 1400 may comprise a curved portion. The second portion 1420 of the holder terminal 1400 may comprise any one or more of a curved shape, a bended shape, a bent shape, and a twisted shape. In the present embodiment, since it may be difficult to equalize the spacing of the exposed region in the mold material being implemented on an upper side and the pitch of the exposed region implemented to be connected with the lower substrate 1010, a curved shape as described above may be applied to the second portion 1420 of the holder terminal 1400. In implementing the metal shape, a pressing or etching process may be applied, and in this case, the distance between the metal shapes may be about 1.5 times or more of the thickness.

The second portion 1420 of the holder terminal 1400 may comprise: a first region 1421 being extended in a straight line from the first portion 1410 of the holder terminal 1400; a second region 1422 being extended in a straight line and at least a portion not being overlapped with the first region 1421 in an optical axis direction; and a third region 1423 connecting the first region 1421 and the second region 1422.

The second portion 1420 of the holder terminal 1400 may comprise: a first region 1421 connected to the first portion 1410 of the holder terminal 1400 and having a first width (refer to W1 in FIG. 34); a second region 1422, at least a portion thereof disposed at a lower position than the first region 1421, and having a second width (refer to W2 in FIG. 34); and a third region 1423 disposed between the first region 1421 and the second region 1422 and having a third width greater than the first width W1 (refer to W3 in FIG. 34). At this time, the first width W1 and the second width W2 may be the same.

The second portion 1420 of the holder terminal 1400 may comprise: a first region 1421 being extended downward along an optical axis direction from the first portion 1410 of the holder terminal 1400; a third region 1423 being extended from the first region 1421 in a different direction from the first region 1421; and a second region 1422 being extended downward along the optical axis direction from the third region 1423.

The second portion 1420 of the holder terminal 1400 may comprise: a third region 1423 that is disposed long in the horizontal direction; a first region 1421 connecting one end of the third region 1423 and the first portion 1410 of the holder terminal 1400; and a second region 1422 being extended from the other end portion of the third region 1423 and forming a lower end of the second portion 1420 of the holder terminal 1400. However, in a modified embodiment, the third region 1423 of the second portion 1420 of the holder terminal 1400 may be extended obliquely. That is, the third region 1423 may diagonally connect the first region 1421 and the second region 1422.

The camera device may comprise a connection terminal 1500. The connection terminal 1500 may be coupled to the variable lens unit 1300. The connection terminal 1500 may be coupled to the liquid lens holder 1320. The connection terminal 1500 may electrically connect the liquid lens 1310 and the holder terminal 1400. The connection terminal 1500 may be formed of an electrically conductive material. The connection terminal 1500 may be formed of metal.

The connection terminal 1500 may comprise a first terminal 1510 for directly connecting some of the individual terminals 1312 and the holder terminal 1400. The connection terminal 1500 may comprise a first terminal 1510 for electrically connecting the first and second individual terminals 1312 formed on an upper surface of the liquid lens 1310 to the holder terminal 1400, respectively.

The first terminal 1510 may comprise: a first region being connected to the individual terminal 1312 of the liquid lens 1310; a second region being connected to the conductive member connected to the holder terminal 1400; and a third region connecting the first region and the second region. The first region and the third region of the first terminal 1510 may be coupled to the liquid lens holder 1320, and the second region may be protruded more outward than the liquid lens holder 1320. Furthermore, the first terminal 1510 may comprise a hook being protruded from the first region. The hook of the first terminal 1510 may be coupled to the liquid lens holder 1320 so that the coupling force between the first terminal 1510 and the liquid lens holder 1320 can be increased.

The connection terminal 1500 may comprise second to fourth terminals 1520, 1530, and 1540 connecting the remaining part among the individual terminals 1312 and the holder terminal 1400. The connection terminal 1500 may comprise: a second terminal 1520 connected to the third and fourth individual terminals 1312 formed on an upper surface of the liquid lens 1310, respectively; a third terminal 1530 coupled to the liquid lens holder 1320 and electrically connected to the holder terminal 1400; and a fourth terminal 1540 that connects the second terminal 1520 and the third terminal 1530 and is disposed below the liquid lens 1310.

The second terminal 1520 may comprise: a first region connected to an individual terminal 1312 of a liquid lens 1310; a second region connected to a fourth terminal 1540; a third region connecting the first region and the second region and fixed to a liquid lens holder 1320, and a fourth region being extended outward from the second region. The second terminal 1520 may have a U-shape when viewed from the side. The second terminal 1520 may be firmly fixed to the liquid lens holder 1320 through a U-shape. A lower end of the second terminal 1520 and the fourth terminal 1540 may be connected through a conductive member.

The third terminal 1530 may comprise: a first region connected to a fourth terminal 1540; a second region connected to a conductive member connected to a holder terminal 1400; and a third region that connects the first region and the second region and is fixed to a liquid lens holder 1320. The third region of the third terminal 1530 may be formed in an inverted U-shape. The third terminal 1530 may be firmly fixed to the liquid lens holder 1320 through the aforementioned shape.

The fourth terminal 1540 may comprise: a first region being connected to the second terminal 1520; a second region being connected to the third terminal 1530; and a third region connecting the first region and the second region. The third region of the fourth terminal 1540 may comprise a curved shape. The fourth terminal 1540 may be disposed below the liquid lens 1310 and the liquid lens holder 1320.

The connection terminal 1500 may comprise fifth and sixth terminals 1550 and 1560 connecting the common terminal 1313 of a liquid lens 1310 and a holder terminal 1400. The connection terminal 1500 may comprise: a fifth terminal 1550 being coupled to the liquid lens holder 1320 and electrically being connected to the holder terminal 1400; a sixth terminal 1560 connecting the common terminal 1313 and the fifth terminal 1550 formed on a lower surface of the liquid lens 1310.

The fifth terminal 1550 may be formed in a shape corresponding to the third terminal 1530. The fifth terminal 1550 may comprise: a first region connected to a sixth terminal 1560; a second region being connected to a conductive member connected to a holder terminal 1400; and a third region that connects the first region and the second region and is fixed to a liquid lens holder 1320. The third region of the fifth terminal 1550 may be formed in an inverted U-shape. The fifth terminal 1550 may be firmly fixed to the liquid lens holder 1320 through the aforementioned shape.

The sixth terminal 1560 may comprise: a first region being connected to a common terminal 1313 of a liquid lens 1310; a second region being connected to a fifth terminal 1550; and a third region connecting the first region and the second region.

The camera device may comprise a cover 1800. The cover 1800 may cover the holder 1100. The cover 1800 may be coupled to the holder 1100. The cover 1800 may be disposed in the step portion 1120 of the holder 1100. An inner surface of the side plate 1820 of the cover 1800 may be fixed to a side surface of the holder 1100 by an adhesive. The cover 1800 may accommodate a portion of the lens module 1200 therein. The cover 1800 may form an outer appearance of the camera device. The cover 1800 may have a hexahedral shape with an open lower surface. The cover 1800 may be a non-magnetic material. The cover 1800 may be formed of a metal material. The cover 1800 may be formed of a metal plate. The cover 1800 may be connected to the ground portion of the substrate 1010. Through this, the cover 1800 may be grounded. The cover 1800 may block electromagnetic interference (EMI). At this time, the cover 1800 may be referred to as an 'EMI shield can'.

The cover 1800 may comprise an upper plate 1810 and a side plate 1820. The cover 1800 may comprise an upper plate 1810 comprising a hole, and a side plate 1820 being extended downward from an outer circumference of the upper plate 1810.

The camera device may comprise a conductive member. The conductive member may comprise Ag epoxy. A conductive member may be conductive. The conductive member may be disposed in an epoxy tank formed in the holder 1100. The conductive member can be disposed for coupling between terminals. The conductive member may be used for coupling between the connection terminals 1500 and between the connection terminal 1500 and the holder terminal 1400. The conductive member may be viscous.

Hereinafter, a configuration of a camera device according to a modified embodiment will be described with reference to the drawings.

FIG. 35 (*a*) is a plan view illustrating a top view of a holder terminal according to a first modified embodiment, (b) is a front view, and (c) is a side view.

The shape of the third holder terminal 1403 of the holder terminal 1400a of a first modified embodiment may be changed compared to the holder terminal 1400 of the present embodiment. For this reason, the shapes and/or positions of the first, second, fourth, and fifth holder terminals 1401, 1402, 1404, and 1405 may also be partially changed. Due to the change in the shape of the third holder terminal 1403, in a first modified embodiment, the first to fifth holder terminals 1401, 1402, 1403, 1404, and 1405 may not be symmetrical with respect to an imaginary straight line passing through the center of the third holder terminal 1403.

In a first modified embodiment, the second portion 1420 of the third holder terminal 1403 may comprise: a first region 1421a being connected to a first portion 1410; at least a portion of the first region 1421a and a second region 1422a not being overlapped with each other in an optical axis direction; and a third region 1423a connecting the first region 1421a and the second region 1422a.

FIG. 36 (a) is a plan view illustrating a top view of a holder terminal according to a second modified embodiment, (b) is a front view, and (c) is a side view.

The shape of the fourth holder terminal 1404 of the holder terminal 1400b of a second modified embodiment may be changed compared to the holder terminal 1400a of a first modified embodiment. For this reason, the shapes and/or positions of the first, second, third, and fifth holder terminals 1401, 1402, 1403, and 1405 may also be partially changed. In the second modified embodiment, the first to fifth holder terminals 1401, 1402, 1403, 1404, and 1405 may not be symmetric with respect to an imaginary straight line passing through the center of the third holder terminal 1403.

In a second modified embodiment, the second portion 1420 of the fourth holder terminal 1404 may comprise: a first region 1421b being connected to the first portion 1410; at least a portion of the first region 1421b and a second region 1422b not being overlapped with each other in an optical axis direction; and a third region 1423b connecting the first region 1421b and the second region 1422b.

FIG. 37 (a) is a plan view illustrating a top view of a holder terminal according to a third modified embodiment, (b) is a front view, and (c) is a side view.

Unlike the holder terminals 1400, 1400a, and 1400b are provided in five in the present embodiment, the first modified embodiment, and the second modified embodiment, the holder terminals 1400c of a third modified embodiment may be provided in six. In the third embodiment, the first to sixth holder terminals 1401, 1402, 1403, 1404, 1405, and 1406 may be disposed symmetrically with respect to an imaginary straight line passing between the third holder terminal 1403 and the fourth holder terminal 1404.

For an example, the second portion 1420 of the fourth holder terminal 1404 constituting the holder terminal 1400c of a third modified embodiment may comprise: a first region 1421c being connected to the first portion 1410; at least a portion of the first region 1421c and a second region 1422c not being overlapped with each other in an optical axis direction; and a third region 1423c connecting the first region 1421c and the second region 1422c.

FIG. 38 (a) is a plan view illustrating a top view of a holder terminal according to a fourth modified embodiment, (b) is a front view, and (c) is a side view.

In the holder terminal 1400d of a fourth modified embodiment, the shape of the fourth holder terminal 1404 may be changed compared with the holder terminal 1400c of a third modified embodiment. For this reason, the shapes and/or positions of the first, second, third, fifth, and sixth holder terminals 1401, 1402, 1403, 1405, and 1406 may be partially changed. In the fourth modified embodiment, the first to sixth holder terminals 1401, 1402, 1403, 1404, 1405, and 1406 may not be symmetrical with respect to an imaginary straight line passing between the third holder terminal 1403 and the fourth holder terminal 1404.

In a fourth modified embodiment, the second portion 1420 of a fourth holder terminal 1404 may comprise: a first region 1421d being connected to a first portion 1410; at least a portion of the first region 1421d and a second region 1422d not being overlapped with each other in an optical axis direction; and a third region 1423d connecting the first region 1421d and the second region 1422d.

FIG. 39 (a) is a plan view illustrating a top view of a holder terminal according to a fifth modified embodiment, (b) is a front view, and (c) is a side view.

In the holder terminal 1400e of a fifth modified embodiment, the shape of the fifth holder terminal 1405 may be changed compared with the holder terminal 1400d of a fourth modified embodiment. For this reason, the shapes and/or positions of the first, second, third, fourth, and sixth holder terminals 1401, 1402, 1403, 1404, and 1406 may be partially changed. In the fourth modified embodiment, the first to sixth holder terminals 1401, 1402, 1403, 1404, 1405, and 1406 may not be symmetrical with respect to an imaginary straight line passing between the third holder terminal 1403 and the fourth holder terminal 1404.

In a fifth modified embodiment, the second portion 1420 of the fifth holder terminal 1405 may comprise: a first region 1421e being connected to the first portion 1410; at least a portion of the first region 1421e and a second region 1422e not being overlapped with each other in an optical axis direction; and a third region 1423e connecting the first region 1421e and the second region 1422e.

Although a first embodiment and a second embodiment of the present invention have been described separately, some configurations of the first embodiment may be comprised in the second embodiment, and some configurations of the second embodiment may be comprised in the first embodiment. That is, a modified embodiment of the present invention may comprise some configurations of the first embodiment and some configurations of the second embodiment together. Some configurations of any one of the first and second embodiments may be substituted with corresponding configurations of other embodiments. For example, the holder terminal 400 of the first embodiment may be replaced with the holder terminal 1400 of the second embodiment.

Although embodiments of the present invention have been described with reference to the accompanying drawings, those of ordinary skill in the art to which the present invention belongs will be able to understand that the present invention can be embodied in other specific forms without changing its technical spirit or essential features. Therefore, it should be understood that the embodiments described above are illustrative in all respects and not restrictive.

The invention claimed is:
1. A camera device comprising:
a holder;
a lens holder coupled to the holder;
a variable lens unit disposed on the lens holder; and
a holder terminal disposed on the holder,
wherein the holder terminal comprises a first region disposed on an upper surface of the holder and electrically connected to the variable lens unit,
wherein the variable lens unit is not overlapped with the holder in a direction perpendicular to an optical axis,
wherein the variable lens unit comprises a liquid lens holder, a liquid lens disposed in the liquid lens holder, a first connection terminal disposed on the liquid lens holder, and a second connection terminal connecting a terminal of the liquid lens and the first connection terminal, and
wherein the first connection terminal and the second connection terminal are formed as separate members and connected by a conductive member.

2. The camera device of claim 1, wherein the variable lens unit comprises any one or more of a liquid lens, a polymer lens, a liquid crystal lens, a voice coil motor (VCM) actuator, a shape memory alloy (SMA) actuator, and a micro electro mechanical systems (MEMS) actuator.

3. The camera device of claim 1, wherein the first connection terminal comprises a first region disposed on an upper surface or a lower surface of the liquid lens holder and connected to the second connection terminal, and a second region extending from the first region of the first connection terminal and disposed on a side surface of the liquid lens holder.

4. The camera device of claim 3, wherein the first region of the holder terminal and the second region of the first connection terminal are connected by a conductive member.

5. The camera device of claim 1, wherein the liquid lens holder comprises a groove formed on at least one of an upper surface and a lower surface of the liquid lens holder,
wherein a portion of the first region of the first connection terminal is disposed on a floor surface of the groove of the liquid lens holder, and
wherein a conductive member is disposed on the groove of the liquid lens holder to connect the first connection terminal and the second connection terminal.

6. The camera device of claim 5, wherein the groove of the liquid lens holder is inwardly opened to form a step having an inner wall, and
wherein the second connection terminal is disposed in the step of the liquid lens holder.

7. The camera device of claim 1, wherein the holder terminal comprises a plurality of holder terminals,
wherein the holder comprises a partition wall protruding from an upper surface of the holder and disposed between the plurality of holder terminals, and
wherein an upper surface of the partition wall of the holder is disposed at a position lower than a lower end of the variable lens unit.

8. The camera device of claim 1, comprising:
a printed circuit board;
an image sensor disposed on the printed circuit board; and
a plurality of lenses coupled to the lens holder,
wherein the holder is disposed on the printed circuit board, and
wherein the variable lens unit is disposed between the plurality of lenses.

9. The camera device of claim 6, wherein the inner wall of the liquid lens holder comprises an inclined surface.

10. The camera device of claim 6, wherein the second connection terminal is disposed on the groove of the liquid lens holder so as not to be more protruded than the liquid lens holder.

11. The camera device of claim 1, wherein the first region of the holder terminal is overlapped with the variable lens unit in an optical axis direction.

12. The camera device of claim 1, wherein the variable lens unit is more protruded than the lens holder in both sides, and
wherein at least a portion of the variable lens unit is overlapped with the holder in an optical axis direction and spaced apart from the holder to be disposed above the holder.

13. The camera device of claim 1, comprising a cover covering the holder,
wherein the holder comprises a groove recessedly formed on a side surface of the holder,
wherein the holder terminal comprises a second region connected to the first region and disposed on a floor surface of the groove of the holder, and
wherein the second region of the holder terminal is spaced apart from the cover in the direction perpendicular to the optical axis.

14. An optical apparatus comprising:
a main body;
the camera device of claim 1 disposed on the main body; and
a display unit disposed on the main body and outputting an image photographed by the camera device.

15. A camera device comprising:
a holder;
a lens holder disposed on the holder; and
a variable lens unit disposed on the lens holder,
wherein the variable lens unit comprises a liquid lens holder, a liquid lens disposed in the liquid lens holder, a first connection terminal disposed on the liquid lens holder, and a second connection terminal connecting a terminal of the liquid lens and the first connection terminal, and
wherein the variable lens unit is not overlapped with the holder in a direction perpendicular to an optical axis, and
wherein the first connection terminal and the second connection terminal are formed as separate members and connected by a conductive member.

16. The camera device of claim 15, comprising a holder terminal disposed on the holder,
wherein the holder terminal comprises a first region disposed on an upper surface of the holder and electrically connected to the variable lens unit, and
wherein the first region of the holder terminal is overlapped with the variable lens unit in an optical axis direction.

17. The camera device of claim 16, wherein the first region of the holder terminal is overlapped with the liquid lens holder in the optical axis direction.

* * * * *